US010371482B2

(12) United States Patent
Roberts et al.

(10) Patent No.: US 10,371,482 B2
(45) Date of Patent: *Aug. 6, 2019

(54) CONNECTOR

(71) Applicant: Magpul Industries Corp., Austin, TX (US)

(72) Inventors: Timothy Eric Roberts, Broomfield, CO (US); Michael T. Mayberry, Denver, CO (US); William Bradley Bennett, Lafayette, CO (US); Duane Liptak, Erie, CO (US); Brian L. Nakayama, Arvada, CO (US); Eric Nakayama, Broomfield, CO (US)

(73) Assignee: Magpul Industries Corp., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,623

(22) Filed: Mar. 13, 2018

(65) Prior Publication Data
US 2018/0202761 A1   Jul. 19, 2018

Related U.S. Application Data

(63) Continuation of application No. 15/284,249, filed on Oct. 3, 2016, now Pat. No. 9,921,029, which is a (Continued)

(51) Int. Cl.
*F16B 2/18* (2006.01)
*F16B 13/08* (2006.01)
(Continued)

(52) U.S. Cl.
CPC ............. *F41C 27/00* (2013.01); *F41C 23/02* (2013.01); *F41C 33/006* (2013.01);
(Continued)

(58) Field of Classification Search
CPC .......... F41C 23/02; F41C 23/16; F41C 27/00; F41C 33/006; F41G 11/003
See application file for complete search history.

(56) References Cited

U.S. PATENT DOCUMENTS

| 317,448 A | 5/1885 | Evans |
| 632,457 A | 9/1899 | Gardiner |

(Continued)

FOREIGN PATENT DOCUMENTS

| CA | 2512872 A1 | 8/2004 |
| DE | 4244396 A1 | 6/1994 |

(Continued)

OTHER PUBLICATIONS

Schneider, Laura, "Response to Office Action re U.S. Appl. No. 14/658,171", dated Nov. 12, 2015, p. 14 Published in: US.

(Continued)

*Primary Examiner* — Joshua T Semick
(74) *Attorney, Agent, or Firm* — Neugeboren O'Dowd PC

(57) ABSTRACT

An accessory mounting interface and method are disclosed. The interface has an upper portion having a firearm accessory and at least one through hole extending from a first surface to a second surface of the upper portion, the upper portion having a first post portion with a first side surface and a first flange. A first elongated fastener is arranged through the through hole and has a first end extending below the second surface of the upper portion. The interface also has a second post portion that is movable between a first configuration defining a first transverse distance between the first and second side surfaces and a second configuration defining a second transverse distance between the first and second side surfaces, the first transverse distance greater than the second transverse distance. The first flange substantially opposes the second flange when the second post portion is in the first configuration.

20 Claims, 22 Drawing Sheets

Related U.S. Application Data continuation-in-part of application No. 14/964,859, filed on Dec. 10, 2015, now Pat. No. 9,523,554, and a continuation-in-part of application No. 14/945,816, filed on Nov. 19, 2015, now Pat. No. 9,482,487, and a continuation-in-part of application No. 14/658,171, filed on Mar. 14, 2015, now Pat. No. 9,239,210, which is a continuation of application No. 14/581,544, filed on Dec. 23, 2014, now Pat. No. 9,243,866, which is a continuation-in-part of application No. 14/555,615, filed on Nov. 27, 2014, now Pat. No. 9,239,209, which is a continuation-in-part of application No. 14/271,912, filed on May 7, 2014, now Pat. No. 8,925,236.

(60) Provisional application No. 61/974,968, filed on Apr. 3, 2014, provisional application No. 61/926,195, filed on Jan. 10, 2014.

(51) Int. Cl.
  F41C 27/00 (2006.01)
  F41G 11/00 (2006.01)
  F41C 23/02 (2006.01)
  F41C 33/00 (2006.01)

(52) U.S. Cl.
  CPC ............. *F41G 11/003* (2013.01); *F16B 2/18* (2013.01); *F16B 13/0891* (2013.01); *Y10T 29/49716* (2015.01)

(56) References Cited

U.S. PATENT DOCUMENTS

| | | |
|---|---|---|
| 1,099,996 A | 6/1914 | Parsons |
| 1,219,881 A | 3/1917 | Sundback |
| 1,316,640 A | 9/1919 | Parsons |
| 1,748,006 A | 2/1930 | Wohlart |
| 1,820,667 A | 8/1931 | Louis |
| 1,964,427 A | 6/1934 | Chandler |
| 1,993,749 A | 3/1935 | Pleister |
| 2,078,010 A | 4/1937 | Meepos |
| 2,102,964 A | 12/1937 | Mossberg |
| 2,116,618 A | 5/1938 | Crockett |
| 2,187,054 A | 1/1940 | Redfield |
| D143,086 S | 12/1945 | Lowdermilk |
| 2,455,438 A | 12/1948 | Edward |
| 2,480,662 A | 8/1949 | Preston |
| 2,642,689 A | 7/1953 | Cline |
| 2,771,699 A | 11/1956 | Herter |
| 2,782,545 A | 2/1957 | Schadeck |
| 3,078,899 A | 2/1963 | Maclean et al. |
| 3,104,136 A | 9/1963 | Merriman |
| 3,204,284 A | 9/1965 | Merriman |
| 3,226,872 A | 1/1966 | Pachmayr |
| 3,265,416 A | 8/1966 | Downes |
| 3,273,444 A | 9/1966 | Houvener et al. |
| D209,171 S | 11/1967 | Myatt |
| 3,463,045 A | 8/1969 | Prescott |
| 3,493,025 A | 2/1970 | Lalonde et al. |
| 3,798,818 A | 3/1974 | Casull |
| 3,799,027 A | 3/1974 | Galloway |
| 3,844,194 A | 10/1974 | Reinwall |
| 3,880,389 A | 4/1975 | Burris |
| 3,895,408 A | 7/1975 | Leingang |
| D243,580 S | 3/1977 | DeCaro |
| 4,205,473 A | 6/1980 | Wilson |
| D255,772 S | 7/1980 | Johnson et al. |
| 4,353,180 A | 10/1982 | Wilson |
| 4,464,076 A | 8/1984 | Leibhard |
| 4,488,844 A | 12/1984 | Baubles |
| 4,502,238 A | 3/1985 | Farrar et al. |
| 4,542,606 A | 9/1985 | Hoenig |
| 4,545,697 A | 10/1985 | Verdenne et al. |
| 4,571,872 A | 2/1986 | Johnson |
| 4,575,295 A | 3/1986 | Rebentisch |
| 4,602,450 A | 7/1986 | Hoenig |
| 4,605,350 A | 8/1986 | Chater et al. |
| 4,656,689 A | 4/1987 | Dennis |
| 4,830,531 A | 5/1989 | Condit et al. |
| D302,109 S | 7/1989 | Cayce et al. |
| 4,859,118 A | 8/1989 | Schaeffer |
| 4,959,908 A | 10/1990 | Weyrauch |
| 5,020,952 A | 6/1991 | Zeigler et al. |
| 5,048,215 A | 9/1991 | Davis |
| 5,069,586 A | 12/1991 | Casey |
| 5,076,748 A | 12/1991 | Waterfield et al. |
| 5,199,836 A | 4/1993 | Gogarty |
| 5,352,066 A | 10/1994 | Schaeffer et al. |
| 5,375,361 A | 12/1994 | Rustick |
| D367,002 S | 2/1996 | Grey |
| 5,603,594 A | 2/1997 | Lincoln |
| 5,813,158 A | 9/1998 | Campbell et al. |
| D415,533 S | 10/1999 | Shost, Jr. et al. |
| 6,294,734 B1 | 9/2001 | Daoud |
| 6,305,888 B1 | 10/2001 | Leistner |
| D452,140 S | 12/2001 | Shinjo et al. |
| 6,328,513 B1 | 12/2001 | Niwa et al. |
| 6,331,092 B1 | 12/2001 | Linger |
| D452,644 S | 1/2002 | Morita |
| D457,054 S | 5/2002 | Pamer et al. |
| 6,712,540 B2 | 3/2004 | Schmalzhofer et al. |
| 6,712,543 B1 | 3/2004 | Schmalzhofer |
| 6,733,221 B2 | 5/2004 | Linger |
| 6,764,109 B2 | 7/2004 | Richardson et al. |
| 6,767,020 B2 | 7/2004 | Yamamoto et al. |
| D499,010 S | 11/2004 | Velten |
| D512,302 S | 12/2005 | Velten |
| 7,004,667 B2 | 2/2006 | Ludwig et al. |
| 7,096,620 B2 | 8/2006 | Zeh |
| 7,189,163 B2 | 3/2007 | Nagayama |
| 7,191,557 B2 | 3/2007 | Gablowski et al. |
| 7,322,141 B1 | 1/2008 | Leung |
| 7,430,829 B2 | 10/2008 | Murello |
| 7,654,027 B1 | 2/2010 | Grover |
| 7,716,865 B2 | 5/2010 | Daniel et al. |
| 7,731,464 B2 | 6/2010 | Nagayama |
| 7,765,731 B1 | 8/2010 | Liebig |
| 7,770,317 B1 | 8/2010 | Tankersley |
| 7,793,968 B1 | 9/2010 | Withers |
| 7,802,392 B2 | 9/2010 | Peterson et al. |
| 7,802,395 B1 | 9/2010 | Swan |
| 7,802,953 B2 | 9/2010 | Stephen |
| 7,823,319 B2 | 11/2010 | Casas Salva |
| 7,836,625 B2 | 11/2010 | Swan et al. |
| 7,913,957 B2 | 3/2011 | Nelson et al. |
| D637,896 S | 5/2011 | Dotsey |
| 7,954,268 B2 | 6/2011 | Bentley |
| D642,652 S | 8/2011 | Juarez et al. |
| D660,140 S | 5/2012 | Pawluk |
| 8,201,353 B1 | 6/2012 | Swan |
| 8,215,047 B2 | 7/2012 | Ash, Jr. et al. |
| 8,245,428 B2 | 8/2012 | Griffin |
| 8,282,318 B2 | 10/2012 | Robertson, Jr. |
| 8,393,104 B1 | 3/2013 | Moody et al. |
| D679,580 S | 4/2013 | Fitzpatrick et al. |
| 8,429,843 B2 | 4/2013 | Yan |
| 8,453,402 B2 | 6/2013 | Huang |
| 8,500,358 B1 | 8/2013 | Cassidy |
| 8,516,732 B2 | 8/2013 | Burnsed |
| 8,522,467 B1 | 9/2013 | Christensen et al. |
| 8,544,153 B2 | 10/2013 | Mayberry et al. |
| 8,596,701 B2 | 12/2013 | Alba |
| 8,607,490 B1 | 12/2013 | Zinsner |
| 8,656,622 B2 | 2/2014 | Peterson et al. |
| 8,657,547 B2 | 2/2014 | Herndon |
| 8,739,448 B2 | 6/2014 | Kimmel et al. |
| 8,752,320 B2 | 6/2014 | Masters |
| 8,819,980 B2 | 9/2014 | Geissele |
| 8,821,061 B2 | 9/2014 | Baus |
| 8,832,985 B2 | 9/2014 | Smith |
| 8,832,986 B2 | 9/2014 | Mayberry et al. |
| 8,839,544 B2 | 9/2014 | Troy et al. |

(56) References Cited

U.S. PATENT DOCUMENTS

| | | | |
|---|---|---|---|
| 8,925,236 | B1 | 1/2015 | Mayberry et al. |
| 8,931,137 | B2 | 1/2015 | Daniel et al. |
| 9,010,008 | B2* | 4/2015 | Hovey .................... F41C 23/16 42/72 |
| 9,103,365 | B2 | 8/2015 | Whipple et al. |
| D737,674 | S | 9/2015 | Tobaruela |
| 9,127,906 | B2 | 9/2015 | Wells et al. |
| 9,157,696 | B2 | 10/2015 | Dextraze |
| 9,267,753 | B2 | 2/2016 | Dextraze et al. |
| D751,661 | S | 3/2016 | Gibbens et al. |
| 9,777,985 | B2* | 10/2017 | Roberts ................. F41G 11/001 |
| 9,921,029 | B2* | 3/2018 | Roberts ................. F41G 11/003 |
| 9,964,380 | B1* | 5/2018 | Oglesby .................. F41C 23/16 |
| 9,976,832 | B2* | 5/2018 | Mayberry ............... F41C 23/16 |
| 10,101,126 | B2* | 10/2018 | Sharron ................ F41G 11/003 |
| 2004/0064994 | A1 | 4/2004 | Luke |
| 2005/0019225 | A1 | 1/2005 | Sanadi |
| 2005/0183380 | A1 | 8/2005 | Sato |
| 2005/0276677 | A1 | 12/2005 | Andersson et al. |
| 2006/0238307 | A1 | 12/2006 | Murello |
| 2007/0234623 | A1 | 10/2007 | Carney |
| 2008/0301994 | A1 | 12/2008 | Langevin et al. |
| 2010/0038607 | A1 | 2/2010 | Nagayama |
| 2010/0303538 | A1 | 12/2010 | Kor et al. |
| 2011/0000146 | A1 | 1/2011 | Takeda et al. |
| 2012/0097807 | A1 | 4/2012 | Rees |
| 2012/0167434 | A1 | 7/2012 | Masters |
| 2012/0297970 | A1 | 11/2012 | Langevin et al. |
| 2013/0074394 | A1 | 3/2013 | LaRue |
| 2013/0177366 | A1 | 7/2013 | Whipple et al. |
| 2013/0276341 | A1 | 10/2013 | Wells et al. |
| 2013/0326925 | A1 | 12/2013 | Power |
| 2014/0041273 | A1 | 2/2014 | Masters |
| 2014/0059908 | A1 | 3/2014 | Dextraze et al. |
| 2014/0116057 | A1 | 5/2014 | Peters |
| 2014/0325889 | A1 | 11/2014 | Michal et al. |
| 2015/0135576 | A1 | 5/2015 | Wells et al. |
| 2015/0184976 | A1 | 7/2015 | Kuczynko |
| 2015/0285289 | A1 | 10/2015 | Burton |
| 2015/0323284 | A1 | 11/2015 | Larson, Jr. |
| 2016/0010946 | A1 | 1/2016 | Gibbens et al. |

FOREIGN PATENT DOCUMENTS

| | | |
|---|---|---|
| DE | 20217838 U1 | 12/2003 |
| DE | 102006011569 A1 | 9/2007 |
| EP | 0441224 A1 | 8/1991 |
| EP | 0478928 A2 | 4/1992 |
| EP | 0601824 A1 | 6/1994 |
| EP | 1500827 A1 | 1/2005 |
| GB | 2501013 A | 10/2013 |

OTHER PUBLICATIONS

Johnson, Stephen, "Office Action re U.S. Appl. Mo. 15/063,396", dated Apr. 29, 2016, p. 11 Published in: US.

Gruber, Stephen S., "Response to Office Action re U.S. Appl. No. 15/063,396", dated May 11, 2016, p. 7 Published in: US.

Johnson, Stephen, "United States Office Action Re U.S. Appl. No. 15/357,216", dated Oct. 5, 2017, p. 41 Published in: US.

Gruber, Stephen S., "Response to United States Office Action Re U.S. Appl. No. 15/357,216", dated Nov. 27, 2017, p. 12 Published in: US.

Lee, Benjamin P., "United States Office Action Re U.S. Appl. No. 14/860,191", dated Feb. 1, 2018, p. 16, Published in: US.

AR15, "Introducing the New ARC LOK Mounting System", Retrieved from http://www.AR15.com/forums/t_2_611/248819_Introducing_the_new_ARC_LOK_mounting_system_.html, Known to exist as early as Mar. 6, 2015, p. 6.

M4CARBINE, "Magpul ASAP Sling Plate", Retrieved from http://www.m4carbine.net/showthread_php?26217-Magpul-ASAP-Sling-Plate, Known to exist as early as Dec. 5, 2013, p. 4.

Unknown, "Bicycle Steerer", Retrieved from https://ccxxuq.blu.livefilestore.com/y1pU5TPO_hTuRNPBn2VTbKOHGeOCtH59hVdN2Fzly_iTf5qst2khE_tIQWJgKEH-98WQhFmIZLb_24/DSC02701.JPG, Known to exist as early as Apr. 1, 2015, p. 1.

bicycledesigner.com, "Stem for Threaded Headset", Retrieved from http://www.bicycledesigner.com/bike-parts/bicycle-stem/stem-for-threaded-headset-1.html, Known to exist as early as Sep. 26, 2014, p. 4.

Aircraft Spruce & Specialty Co., "CAMLOC", Retrieved from http://www.aircraftspruce.com/menus/ha/fast_1camloc.html, Known to exist as early as Sep. 26, 2014, p. 2.

ArmedCitizen76, "Loose AR15 Upper and Lower Fix—Demon Tactical Quick Pin", Retrieved http://www.youtube.com/watch?v=I75YCnj3FTE, Known to exist as early as Apr. 1, 2015, p. 3 Published in: US.

Demon Tactical, "Demon Tactical Quick Pin", Retrieved from http://www.demontactical.com/demon-tactical-quick-p-57648.html, Known to exist as early as Apr. 1, 2015, p. 1.

Southco, "DZUS Push-To-Close, Turn-To-Open Quarter Fasteners", Retrieved from http://www.southco.com/en-us/product/hierarchy.html?hid=7345, Known to exist as early as Sep. 26, 2014, p. 2.

Magpul Industries, Corp., "Forward Sling Mount", Retrieved from https://www.magpul.com/products/forward-sling-mount-1, Known to exist as early as Mar. 26, 2015 , p. 4.

Elzetta, "Configure Your Own Mini-CQB Weapon Light", Retrieved from at http://www.elzetta.com/configure-your-own-mini-cqb-weapon-light.html, Known to exist as early as Apr. 7, 2014, p. 2.

Twangnbang, "Elzetta Mini CQB & ZKL Bow Mount", Retrieved from https://www.youtube.com/watch?v=dEb7OIT_2Kk, Known to exist as early as Jan. 29, 2015, p. 1.

GG&G, "AR-15/M16 Receiver End Plate Sling Mount With Enhanced Heavy Duty Quick Detach Sling Swivel", Retrieved from http://www.gggaz.com/ar-15-m16-receiver-end-plate-qd-sling-mount-with-enhanced-qd-sling-swivels.html, Known to exist as early as Apr. 6, 2015, p. 2.

Gibbz Arms, "Gibbz Arms G4 Upper Reciever", Known to exist as early as Aug. 31, 2015, p. 8.

Global Equipment Company Inc., "80/20 3932 Drop-In T-Nuts", Retrieved from http://www.globalindustrial.com/p/building-materials/struts-and-framing/8020/3932-dropin-tnuts?infoParam.campaignId=T9F&gclid=CKiwq, Known to exist as early as Sep. 25, 2014, p. 2.

Proto-Pic, "Aluminium Extrusion Slim T-Nut for 20×20 M4 Thread", Retrieved from https://proto-pic.co.uk/aluminium-extrusion-slim-t-nut-for-20×20-m4-thread-pack-of-50/, Known to exist as early as Feb. 11, 2016, p. 9.

Bitter End Choppers, "Internal Throttle", Retrieved from http://www.bitterendchoppers.com/Misc.html, Known to axist as early as Apr. 1, 2015, p. 3.

Impact Weapons Components, "Reversible Barrier Weapon Control Hand Stop—Magpul MOE ALL", Retrieved from http://www.impactweaponscomponents.com/product/barrier-weapon-control-handstop-moe-all-and-m-lok/, Known to exist as early as Jul. 20, 2015, p. 2.

Impact Weapons Components, "QD Rotation Limited Sling Mount-N-Slot", Retrieved from http://www.impactweaponscomponents.com/product/rotation-limited-quick-detach-sling/, Known to exist as early as Sep. 14, 2011, p. 5.

Impact Weapons Components, "OCP Sling Mount-N-Slot—Magpul Industries Corp. MS2 & MS3 Slings", Retrieved from http://www.impactweaponscomponents.com/product/ocp-sling-mount-n-slot-designed-for-magpul-industries-corp-ms2-ms3-slingsr, Known to exist as early as Jul. 1, 2011, p. 3.

JP Enterprises, "JP Tension Pin", Retrieved from http://www.jprifles.com/1.5.1.7_small_tp.php, Known to exist as early as Apr. 13, 2016, p. 2 Published in: US.

Lanner Tactical, "Lantac Kam, Keyed Accessory Mount System", Retrieved from https://www.youtube.com/watch?v=gHZ23qo8a0c, Known to exist as early as Mar. 6, 2015, p. 2.

Fastenal, "M6 9.7mm×19mm Zinc Slot 10 Drop-In T-Nut", Retrieved from https://www.fastenal.com/products/details/0961750, Known to exist as early as Feb. 11, 2016, p. 4.

(56) References Cited

OTHER PUBLICATIONS ar15.com, "Magpul M93 QD Plate", Retrieved from http://www.ar15.com/archive/topic.html?b=3&f=12&t=242264, Known to exist as early as Dec. 5, 2013, p. 19.

ar15.com, "Magpul's PRS G3", Retrieved from http://www.ar15.com/archive/topic.html?b=6&f=9&t=213719, Known to exist as early as Dec. 5, 2013, p. 1.

Manticore Arms, Inc., "ARCLight ARC Lok Aluminum Rail Segments", Retrieved from http://www.manticorearms.com/ARClight-ARC-LOK-aluminum-rail-segments-MA-5470.htm, Known to exist as early as Mar. 19, 2015, p. 1.

Midway USA, "Flow to Combine AR-15 Upper and Lower Receivers Presented by Larry Potterfield of Midway USA", Retrieved from http://www.youtube.com/watch?v=v=dXbZeuBacnw, Jun. 28, 2013, p. 3.

Magpul, "MSA MOE Sling Attachment", Retrieved from https://www.magpul.com/products/msa-moe-sling-attachment, Known to exist as early as Mar. 2, 2016, p. 4.

Noveske, "Noveske QD End Plate", Retrieved from http://www.shopnoveske.com/collections/parts/products/noveske-qd-end-plate, Known to exist as early as Apr. 6, 2015, p. 2.

Johnson, Stephen, "Office Action re U.S. Appl. No. 14/555,615", dated Jan. 14, 2015, p. 7, Published in: US.

Johnson, Stephen, "Office Action re U.S. Appl. No. 14/555,615", dated Mar. 20, 2015, p. 39, Published in: US.

Johnson, Stephen, "Office Action re U.S. Appl. No. 14/658,171", dated Apr. 15, 2015, p. 37, Published in: US.

Johnson, Stephen, "Office Action re U.S. Appl. No. 14/555,615", dated Aug. 12, 2015, p. 9, Published in: US.

Johnson, Stephen, "Office Action re U.S. Appl. No. 14/271,912", dated Aug. 18, 2014, p. 33, Published in: US.

Johnson, Stephen, "Office Action re U.S. Appl. No. 14/658,171", dated Aug. 20, 2015, p. 9, Published in: US.

Bing, "QD Swivels Search", Retrieved from http://www.bing.com/images/search?q=QD+swivels&qpvt=QD+swivels&FORM=IQFRML, Known to exist as early as Apr. 1, 2015, p. 2.

Peter White Cycles, "Nitto Racing Stem", Retrieved from http://www.peterwhitecycles.com/images/products/stems/nittoracingstem1.jpg, Known to exist as early as Apr. 1, 2015, p. 1.

Rammounts, "Ram Wedge Search", Retrieved from http://www.rammount.com/search?utf8=%E2%9C93&query=ram+wedge+mount&search_button=GO, Known to exist as early as Apr. 1, 2015, p. 2.

Gruber, Stephen S., "Response to Office Action re U.S. Appl. No. 14/555,615", dated Mar. 10, 2015, p. 8 Published in: US.

Schneider, Laura A., "Response to Office Action re U.S. Appl. No. 14/555,615", dated Jun. 18, 2015, p. 12 Published in: US.

Schneider, Laura A., "Response to Office Action re U.S. Appl. No. 14/658,171", dated Jul. 14, 2015, p. 11 Published in: US.

Gruber, Stephen S., "Response to Office Action re U.S. Appl. No. 14/271,912", dated Sep. 18, 2014, p. 9 Published in: US.

Schneider, Laura A., "Response to Office Action re U.S. Appl. No. 14/555,615", dated Sep. 28, 2015, p. 10 Published in: US.

Schneider, Laura A., "Response to Office Action re U.S. Appl. No. 14/658,171", dated Sep. 28, 2015, p. 13 Published in: US.

Wikipedia, "Quill Stem (Bicycle Part)", Retrieved from http://en.wikipedia.org/wiki/Stem_(bicycle_part), Known to exist as early as Mar. 26, 2015, p. 8.

McMaster-Carr, "Strut Channel", Retrieved from http://www.mcmaster.com/?error_redirect=true#strut-channel-systems/=tw6og7, Known to exist as early as Sep. 26, 2014, p. 7.

McMaster-Carr, "Structural Framing", Retrieved from http://www.mcmaster.com/#strut-channel-systems/=10n0mql, Known to exist as early as Sep. 26, 2014, p. 13.

Shengzhou Baotian Metalwork Co. Ltd, "T Nuts 316.ss", Retrieved from http://www.globalsources.com/si/AS/Shengzhou-Baotian/6008831781474/pdtl/T-Nut-316.ss/1083595328.htm, Known to exist as early as Feb. 11, 2016, p. 4.

Berger Tools Ltd, "GN505 T Nuts, Steel, for Aluminium Extrusion", Retrieved from https://www.berger-tools.co.uk/Gn505_T_Nut_Steel_For_Aluminium_Extrusion/, Known to exist as early as Feb. 11, 2016, p. 5.

Global Industrial, "80/20 3932 Drop-In T-Nuts", Retrieved from http://www.globalindustrial.com/p/building-materials/strust-and-framing/8020/3932-dropin-tnuts?infoParam.campaignId=T9F&gclid=CKiwqoe-_cACFS, known to exist as early as Sep. 26, 2014, p. 2.

Cheaper Than Dirt, "Troy Industries AR-15 OEM M4 Battlesling Endplate Mount with QD Swivel Aluminum Flat Dark Earth SMOU-M4S-00FT-00", Retrieved from http://www.cheaperthandirt.com/product/9-71898, Known to exist as early as Dec. 5, 2013, p. 2.

McMaster-Carr, "Quick-Access Captive Panel Screws", Retrieved from http://www.mcmastercom/?error_redirect=true#quarter-turn-fasteners/=10n0src, Known to exist as early as Sep. 26, 2014, p. 4.

Adafruit Industries, "New Products Jan. 26, 2013", Retrieved from https://www.youtube.com/watch?v=E6n2MKr2P8o, Jan. 29, 2013, p. 2.

American Van Equipment, "Hitch Vise Mount", Retrieved from http://www.americanvan.com/hitch-vise-mount.html, Known to exist as early as Apr. 1, 2015, p. 2.

\* cited by examiner

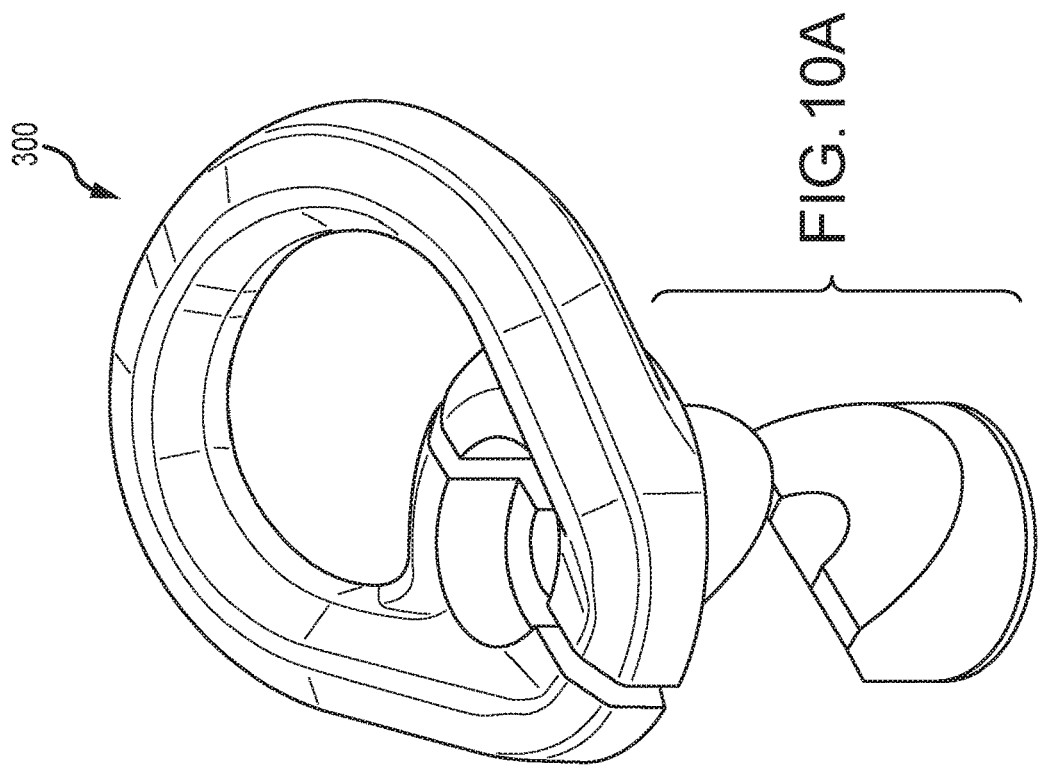
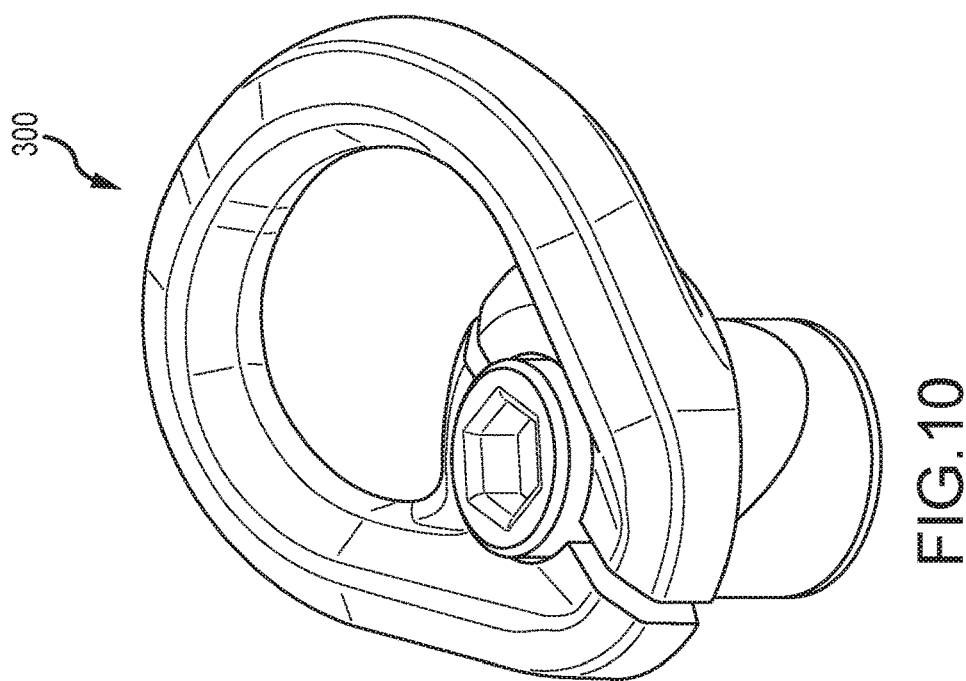

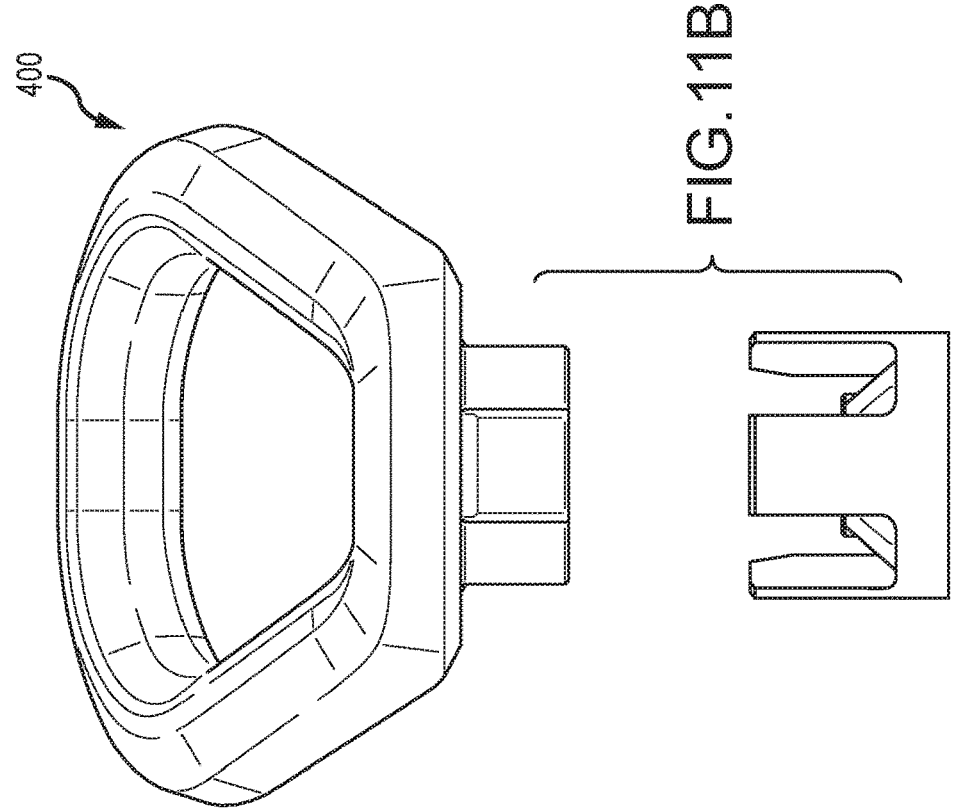
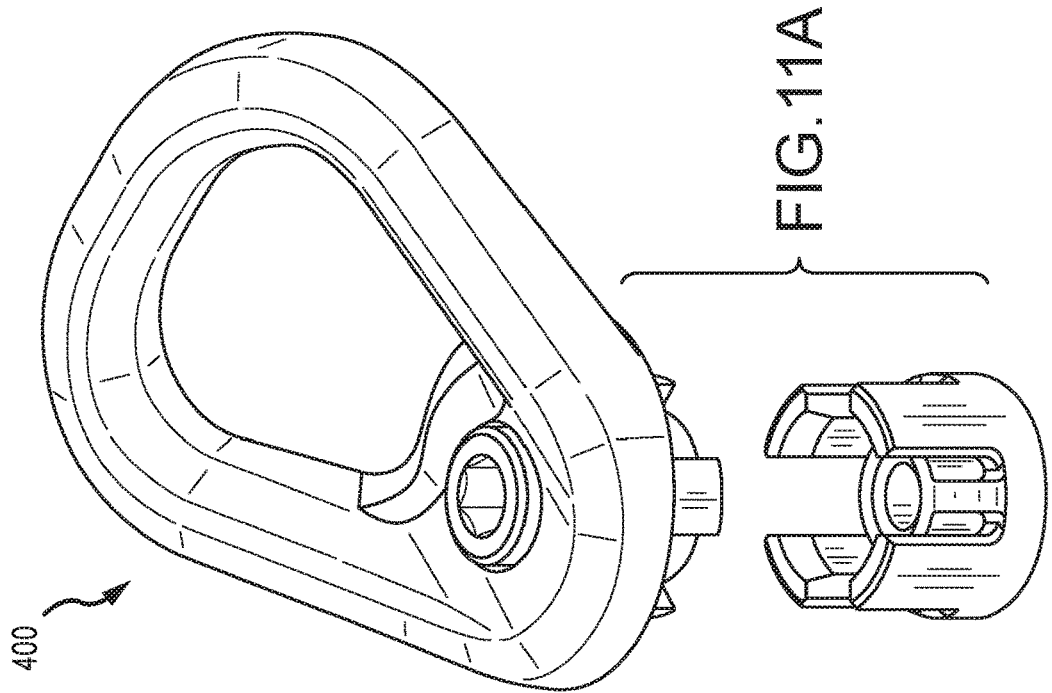

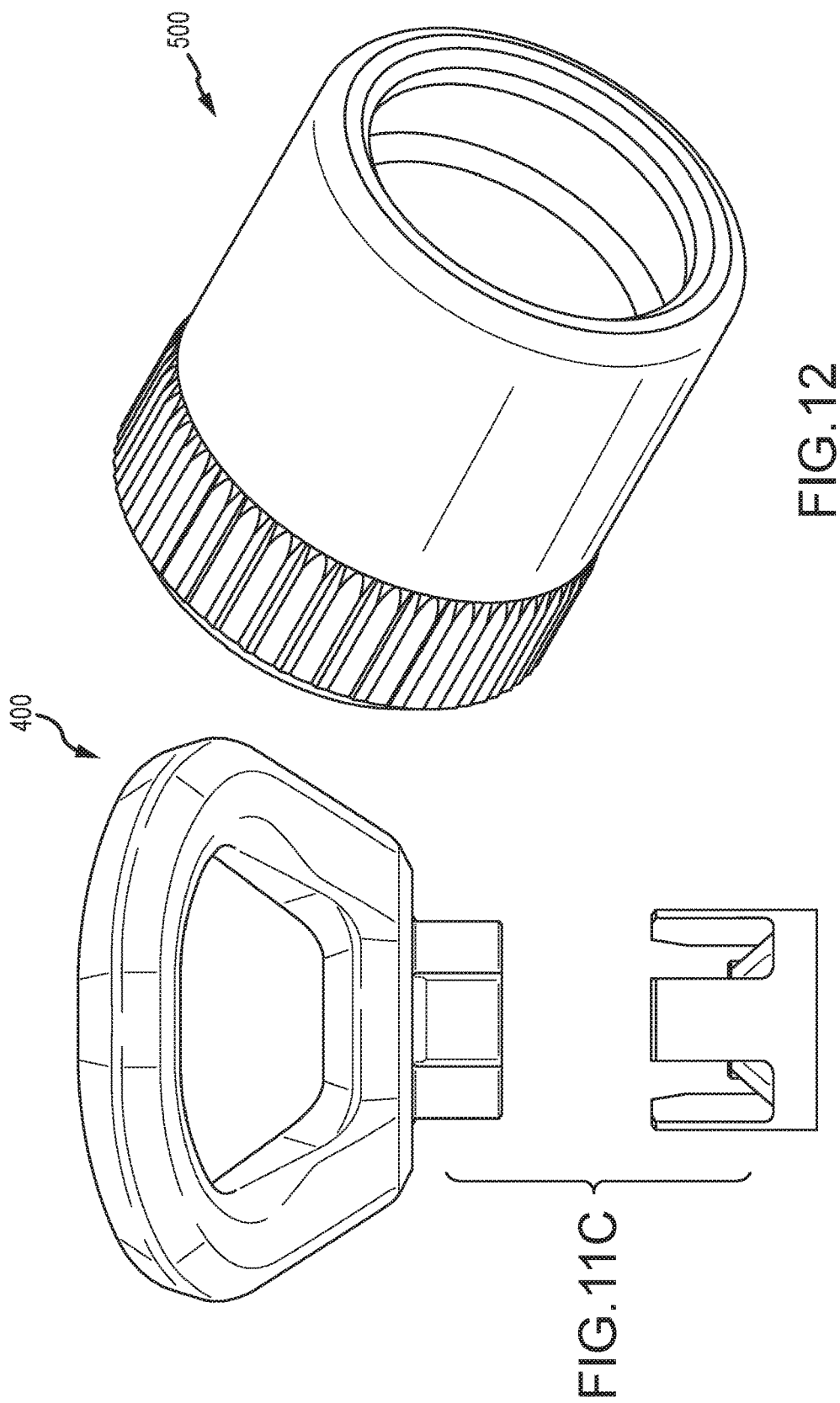

CONNECTOR

CROSS REFERENCE TO RELATED APPLICATIONS

The present Application for Patent is a Continuation of patent application Ser. No. 15/284,249 entitled "CONNECTOR" filed Oct. 3, 2016, which is a continuation-in-part of U.S. patent application Ser. No. 14/945,816, filed on Nov. 19, 2015, and issued as U.S. Pat. No. 9,482,487 on Nov. 1, 2016, entitled "PARACLIP ADAPTER," which is a continuation of U.S. patent application Ser. No. 14/581,544 filed Dec. 23, 2014 and issued as U.S. Pat. No. 9,243,866 on Jan. 26, 2016, entitled "PARACLIP ADAPTER," which claims priority to U.S. Provisional Application No. 61/926,195, filed Jan. 10, 2014, and entitled "QUICK DETACH PARACLIP ADAPTER," the entire disclosures of which are hereby incorporated by reference for all proper purposes.

The present Application for Patent is a Continuation of patent application Ser. No. 15/284,249 entitled "CONNECTOR" filed Oct. 3, 2016, which is also a continuation-in-part of U.S. patent application Ser. No. 14/964,859 filed Dec. 10, 2015 and issued as U.S. Pat. No. 9,523,554 on Dec. 20, 2016, entitled "FIREARM ACCESSORY MOUNTING INTERFACE," which is a continuation of U.S. patent application Ser. No. 14/658,171 filed Mar. 14, 2015 and issued as U.S. Pat. No. 9,239,210 on Jan. 19, 2016, entitled "FIREARM ACCESSORY MOUNTING INTERFACE," which is a continuation-in-part of U.S. patent application Ser. No. 14/555,615 filed Nov. 27, 2014 and issued as U.S. Pat. No. 9,239,209 on Jan. 19, 2016, entitled "FIREARM ACCESSORY MOUNTING INTERFACE," which is a continuation-in-part of U.S. patent application Ser. No. 14/271,912 filed May 7, 2014 and issued as U.S. Pat. No. 8,925,236 on Jan. 6, 2015, entitled "FIREARM ACCESSORY MOUNTING INTERFACE," which claims priority under 35 U.S.C. 119(e) to U.S. Provisional Patent Application No. 61/974,968 filed Apr. 3, 2014, entitled "FIREARM ACCESSORY MOUNTING INTERFACE," the entire disclosures of which are hereby incorporated by reference for all proper purposes.

FIELD OF THE DISCLOSURE

The present disclosure relates generally to firearms accessories. In particular, but not by way of limitation, the present disclosure relates to systems, methods and apparatuses for attaching an accessory to a firearm.

BACKGROUND

Slings are regularly used with firearms to allow for a convenient method of carry and for weapon retention in dynamic environments. Traditional slings mount onto the bottom of a weapon at two points, fore and aft, allowing for suitable carry over long distances and may be used as a steadying aid to improve weapon accuracy. While it offers the user the ability to carry the weapon comfortably over the shoulder or securely across the back, the traditional, bottom-mounted 2-point sling hinders weapon usage in dynamic combat environments since the weapon is stowed in a non-useable orientation. While 2-point slings may be used in combat as an accuracy aid by being wrapped around the arm or other techniques, this encumbers the user through entanglement in the sling itself and is mostly useful only for long-range engagements.

Due to these limitations, side-mounted 2-point or 3-point slings were developed to allow for improved usage as these systems allow the user to carry a weapon comfortably on the front of the body in a usable low-ready position instead of over the back or shoulder. These systems typically incorporate the ability to carry over-the-back or shoulder, like a traditional sling, since these carry positions are useful for climbing, swimming, low (belly) crawling or when maximum frontal dexterity is needed when carrying supplies or wounded. While these slings were a major improvement over the traditional sling, they primarily were intended for use from a single-side and require manual adjustment to allow for transitions from side-to-side in dynamic situations. Additionally, due to the amount of strap material used to wrap around the body, they can also interfere with chest-mounted equipment, such as on load-bearing vests. Traditionally, sling swivels have been used to secure slings to the weapon. These swivels have taken many forms but they all have similar characteristics: namely, they are rotatable (swivel) about a point and are usually an elongated loop through which sling material may be threaded. They have been positioned on either side of the weapon, so that the sling may be said to be mounted on either side, or on the upper and lower surfaces of the weapon, so that the sling may be said to be mounted along the weapon, or a combination thereof.

However, such swivel slings can encumber or entangle the user and thus require quick detachment from the firearm. The quick detach or "QD" interface was thus developed in order to enable rapid removal of a sling from a firearm. The QD interface includes a "QD socket" including a female portion of the interface and a QD body including a male portion of the interface. The QD socket (sometimes referred to as a "swivel socket") typically includes an axial cavity sometimes having an annular ring into which a portion of the QD body can selectively couple to. The QD body typically includes some type of loop or bail for either threading a sling through or for coupling to via a clip such as the snap clip illustrated in U.S. Design Pat. 679,580 or as described in U.S. Pat. No. 8,544,153. The QD body also typically includes a "connection post" that fits into and interfaces with the axial cavity of the QD socket. In particular, many QD bodies feature an internal spring loaded plunger that biases a plurality of ball bearings through the QD connection post. The ball bearings then interface with a ridge in a QD socket and hold the QD body in place. When desired, the user depresses the plunger and the bias on the ball bearings is removed, allowing them to roll into the casing and thereby allowing the QD body to be removed from the QD socket.

Some exemplary QD sockets include the EZ CARBINE QD SWIVEL ATTACHMENT POINT from DANIEL DEFENSE, and the RAIL MOUNT QD SLING SWIVEL from DANIEL DEFENSE, to name a few. Some exemplary QD bodies include the QUICK-DETACH SLING SWIVEL from VLTOR WEAPON SYSTEMS, the QD SLING SWIVEL from DAMAGE INDUSTRIES, the QD SWIVEL from DANIEL DEFENSE, and the HEAVY DUTY FLUSH BUTTON SWIVEL from MI, to name a few.

Popularity of the QD interface has led manufacturers to include QD sockets on many firearms and firearms accessories and has led many users to add QD sockets to their firearms. However, the QD body is often large and adds weight to a firearm. Also, the QD interface is believed by some to be vulnerable to detachment under severe static and dynamic force situations. Thus, there is a need for an adapter able to couple to a QD socket but having lighter weight, smaller size, and a more reliable and/or semi-permanent coupling mechanism than existing QD bodies.

SUMMARY

An exemplary accessory mounting interface for an elongated slot in a firearm is disclosed. The exemplary interface has an upper portion having a firearm accessory and at least one through hole extending from a first surface to a second surface of the upper portion. The upper portion has a first post portion with a first side surface and a first flange. The exemplary interface also has a first elongated fastener arranged through the through hole, the first elongated fastener having a first end extending below the second surface of the upper portion. The exemplary interface also has a second post portion having a second flange and a second side surface, the second side surface at least partially opposing the first side surface. The second post portion is coupled to the first elongated fastener. The second post portion is movable between a first configuration defining a first transverse distance between the first and second side surfaces and a second configuration defining a second transverse distance between the first and second tabs. The first transverse distance greater than the second transverse distance. The first flange substantially opposes the second flange when the second post portion is in the first configuration.

An exemplary method of attaching an accessory mounting interface to a firearm is also disclosed. The exemplary method includes providing an accessory mounting interface, interface comprising: (a) an upper portion having a firearm accessory and at least one through hole extending from a first surface to a second surface of the upper portion, the upper portion having a first post portion with a first side surface and a first flange; (b) a first elongated fastener; and (c) a second post portion having a second flange and a second side surface, the second side surface at least partially opposing the first side surface. The exemplary method further includes arranging the first elongated fastener such that the elongated fastener extends through the through hole below the second surface of the upper portion. The exemplary method further includes movably coupling the second post portion to the first elongated fastener. The exemplary method further includes moving the second post portion between a first configuration defining a first transverse distance between the first and second side surfaces and a second configuration defining a second transverse distance between the first and second tabs, the first transverse distance greater than the second transverse distance. The first flange substantially opposes the second flange when the second post portion is in the first configuration.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

FIG. 10 is an isometric view of another alternative adapter having another wedging feature;
FIG. 10A is an exploded isometric view of the upper portion and lower portion of the another alternative adapter in FIG. 10;
FIG. 11A is an exploded isometric view of the upper portion and lower portion of the another alternative adapter in FIG. 11;
FIG. 11B is an exploded front view of the upper portion and lower portion of the another alternative adapter in FIG. 11;
FIG. 11C is an exploded rear view of the upper portion and lower portion of the another alternative adapter in FIG. 11;
FIG. 12 is an isometric view of an exemplary QD socket used with an embodiment of the adapter.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The present disclosure relates generally to firearms accessories. In particular, but not by way of limitation, the present disclosure relates to systems, methods and apparatuses for quickly attaching and detaching an adapter to a firearm configured for coupling to a sling.

Herein disclosed is an adapter that avoids the weight and size of a traditional QD body by using a smaller and lighter fixed loop or other fixed attachment point. Overcoming the risk of a traditional QD body unintentionally detaching from a QD socket, the herein disclosed adapter includes various attachment means used to fix the adapter to a QD socket (either allowing some, minimal, or no rotation depending on the QD socket) in a semi-permanent manner. In one embodiment, a wedged design is used (see FIGS. 1-8) wherein turning of a screw that passes through the adapter changes an effective outer diameter of a connection post of the adapter by pulling an upper and lower portion of the connection post together vertically and forcing them apart laterally. In some embodiments, the effective outer diameter can be greater than an inner diameter of the QD socket.

Figure 1:
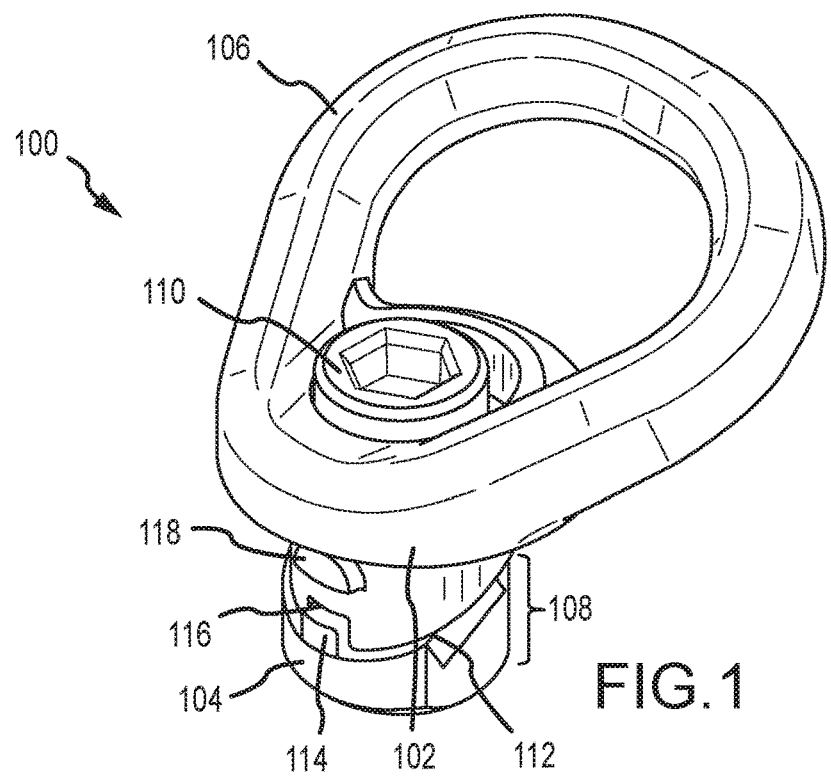
FIG. 1 is an isometric view of a wedging QD adapter.

FIG. 1 is an isometric view of a novel wedging adapter according to one embodiment of this disclosure. The illustrated wedging QD body 100 includes a loop that can be clipped into via a sling. The QD body 100 also includes a connection post 108 affixed to the connection post 108 and including an upper portion 102 of the connection post 108 and a lower portion 104 of the connection post 108. The adapter 100 can be tightened and coupled into a QD socket by tightening a screw 110 (although illustrated as a hex screw, other types of screws can also be used). The screw 110 passes generally longitudinally through an elongate slot in the upper portion 102 and screws into a threaded opening in the lower portion 104. As the screw 110 tightens, the upper portion 102 and the lower portion 104 are drawn together. However, when the two portions 102, 104 meet at an angled interface 112, continued rotation of the screw 110 continues to apply vertical force between the two portions 102, 104 causing the upper and lower portions 102, 104 to move laterally relative to each other and thereby causing an increase in an effective outer diameter of the connection post 108. In the illustrated embodiment, as the screw 110 is tightened, the upper portion 102 would move out of the page and to the left of the page while the lower portion 104 would move into the page and to the right of the page.

The direction of lateral movement can be controlled by an optional guide ridge 114 in the lower portion 104 that interfaces with an optional guide valley 116 in the upper portion 102. The optional guide ridge 114 and the optional guide valley 116 can be shaped and sized so as to fit into each other. In the illustrated embodiment, the guide ridge 114 and the guide valley 116 are arranged parallel to a plane that passes through the adapter from a front to a back and from a top to a bottom of the adapter 100. In some embodiments, the guide ridge 114 has a seat 114a that has an abutting surface perpendicular to a longitudinal axis of the connection post and a nesting seat 114b having an abutting surface parallel to the longitudinal axis. In other non-illustrated embodiments, other planes for lateral movement can be used and thereby effect different directions of lateral movement between the upper and lower portions 102, 104.

The connection post 108 includes a tab 118 on a front side (part of the upper portion 102) and a tab 120 on a back side (part of the lower portion 104). As the upper and lower portions 102, 104 move laterally relative to each other, the tabs 118, 120 move laterally apart and thus increase an effective outer diameter of the connection post 108 and hence enable the tabs 118, 120 to lock into an annular groove in a QD socket. While mere pressure from the adapter 100 on the inner diameter of a QD socket can prevent swiveling of the adapter 100, in some cases a QD socket can include a discontinuous annular groove or other openings in a side of the QD socket that the tabs 118, 120 can fit into and thereby prevent swiveling of the adapter, or at least prevent more than a set amount of swiveling.

Figure 5A:
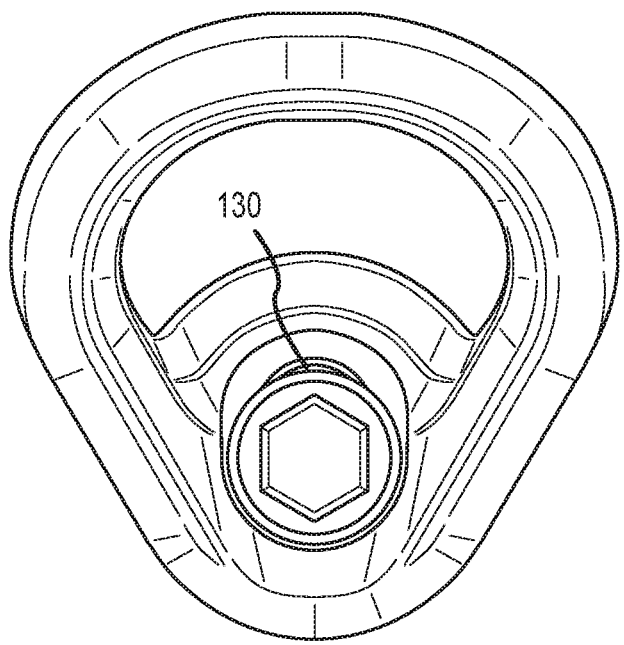
FIG. 5A is a top view of the adapter in FIG. 1.
Figure 5B:
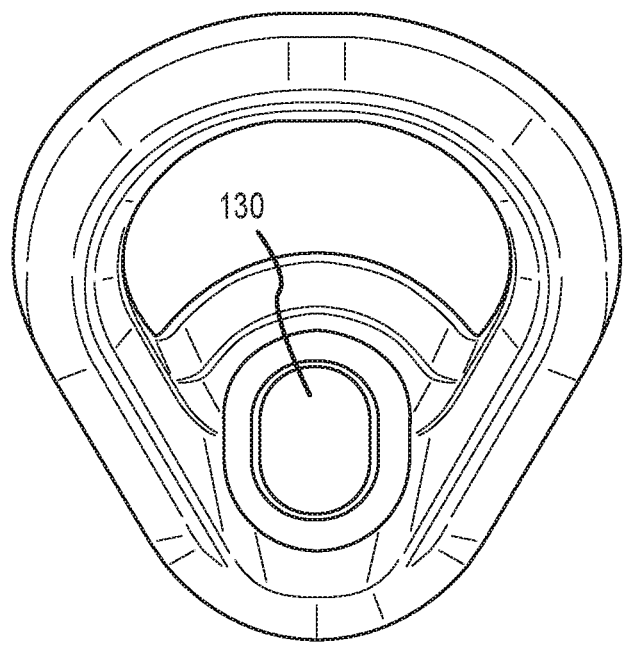
FIG. 5B is a top view of the upper portion of the adapter in FIG. 1.
Figure 7:
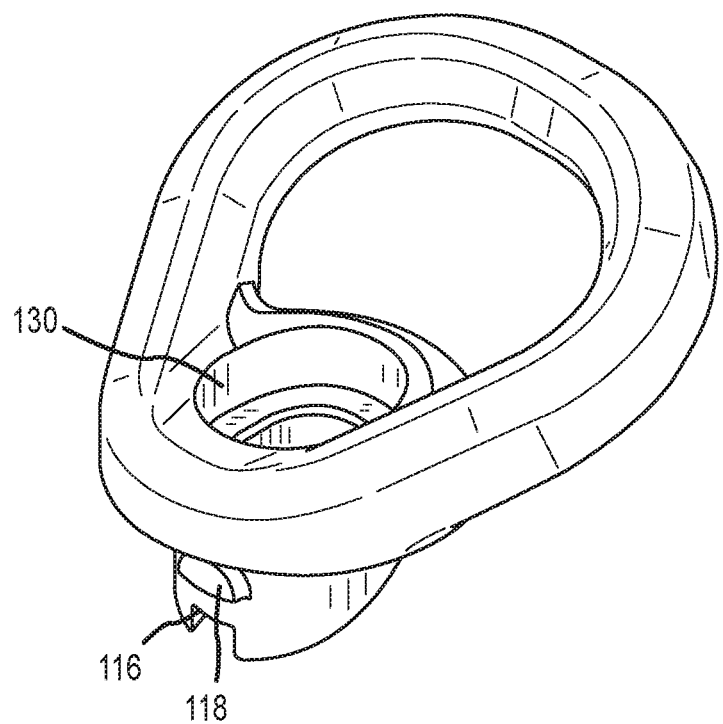
FIG. 7 is an isometric view of the upper portion of the adapter in FIG. 1.

The screw 110 passes through an elongated slot 130 in the upper portion 102 as seen in FIGS. 5B and 7. The elongated slot 130 enables the screw 110 to move laterally relative to the upper portion 102. Since the screw 110 couples to an internal threading of the lower portion 104, the screw 110 does not move laterally relative to the lower portion 104. However, as the screw 110 is tightened and loosened it moves laterally relative to the upper portion 104 and thus the elongated slot 130 allows this lateral movement. The longer dimension of the elongated slot 130 can be arranged parallel to the axis of lateral movement of the upper and lower portions 102, 104 relative to each other.

Figure 3:
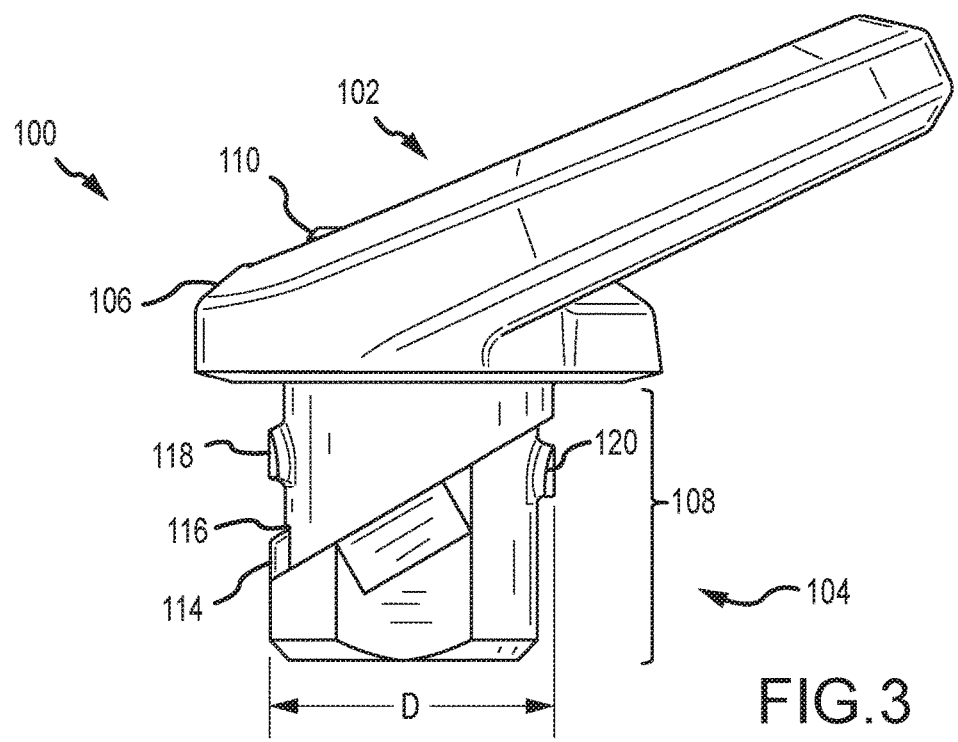
FIG. 3 is a side view of the adapter in FIG. 1.
Figure 4A:
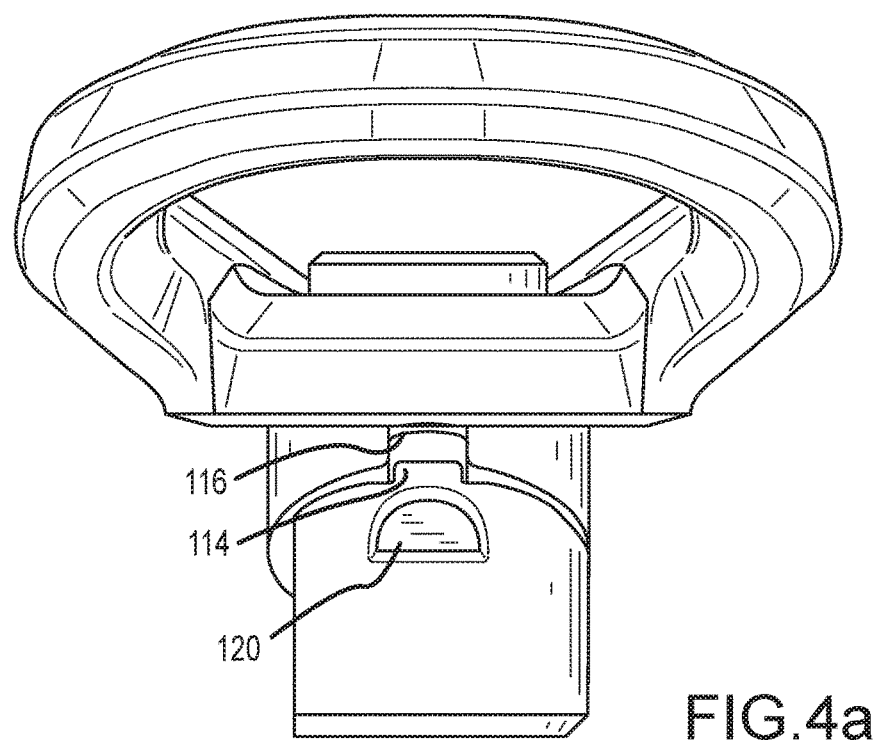
FIG. 4A is a rear view of the adapter in FIG. 1.
Figure 4B:
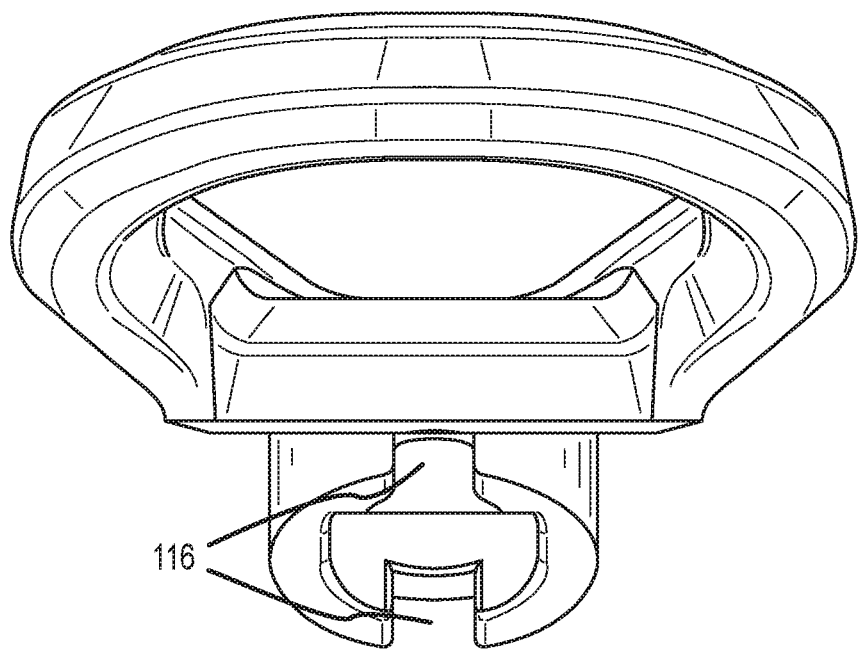
FIG. 4B is a rear view of the upper portion of the adapter in FIG. 1.
Figure 8:
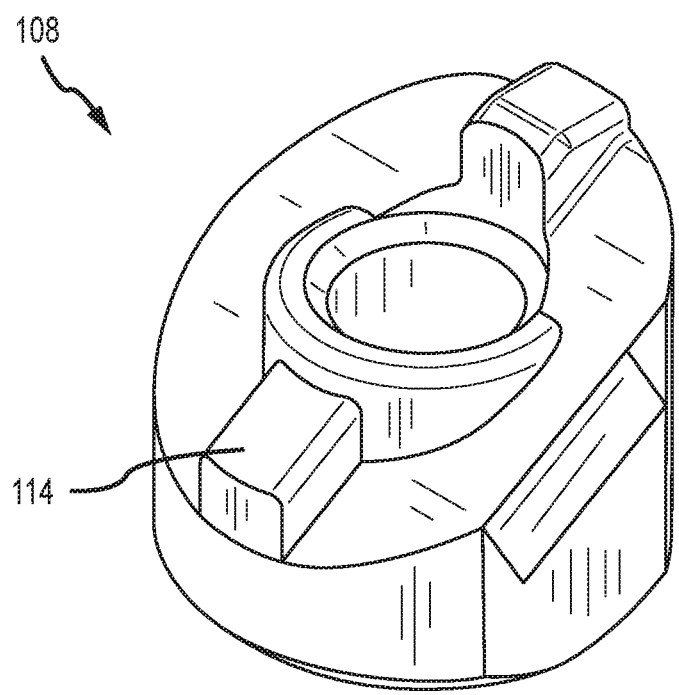
FIG. 8 is an isometric view of the lower portion of the adapter in FIG. 1.

An effective outer diameter of the adapter 100 has been discussed throughout this disclosure. The effective outer diameter is a maximum diameter of portions of the connection post 108 that interface with a QD socket as illustrated in FIG. 3. FIG. 3 shows the upper and lower portions 102, 104 when the screw 110 is relatively loose, and hence the effective outer diameter of the connection post 108 is near a minimum. As the screw 110 tightens, the lower portion 104 would move to the right and the upper portion 102 would move to the left, relative to each other on the page. As can be seen, this causes the effective outer diameter of the connection post 108 to increase and in this way a tight interface can be formed between the connection post 108 and a QD socket. The effective outer diameter D is defined by a transverse distance between the two tabs 118, 120. It should be understood that, although the tabs 118, 120 are shown opposing one another, the tabs 118, 120 need not necessarily be 180 degrees apart. FIG. 4A illustrates a back view of the adapter 100 in FIG. 3, including the tab 120 for interfacing with a QD socket, and a guide mechanism 117. The guide mechanism 117 is shown with a guide ridge 114 in the lower portion 104 interfacing with a guide valley 116 in the upper portion 102, to limit rotation of the upper portion 102 relative to the lower portion 104. FIG. 4B illustrates a back view of the upper portion 102 and guide valley 116 therein. FIGS. 7 and 8 illustrate isometric views of the features in further detail, including an optional deflashing surface 115, wherein excess material has been removed after a molding operation. Specifically, although the assembly 100 may include a deflashing surface 115, depending on the manufacturing method chosen, the surface may be absent in some embodiments.

In some embodiments, and as illustrated in FIGS. 7-8, the adapter may have a travel stop 103, 109. The travel stop 103 has a first contact surface 105 in a first post portion, which may be the upper portion 102, and the first contact surface 105 is perpendicular to the longitudinal axis of the first post portion. The travel stop 103 also has a second contact surface 107 in the first post portion that is parallel to the longitudinal axis. The first contact surface 105 defines the first configuration and the second contact surface 107 defines the second configuration.

The angled interface 112 can have an angle of approximately 30° when measured relative to a horizontal plane passing through front, rear, and sides of the adapter 100 (i.e., parallel to the page in FIG. 5A). However, other angles are also envisioned and those between 15° and 45° may be preferred where greater lateral forces and/or lateral movement of the upper and lower portions 102, 104 relative to each other are desired.

Figure 2:
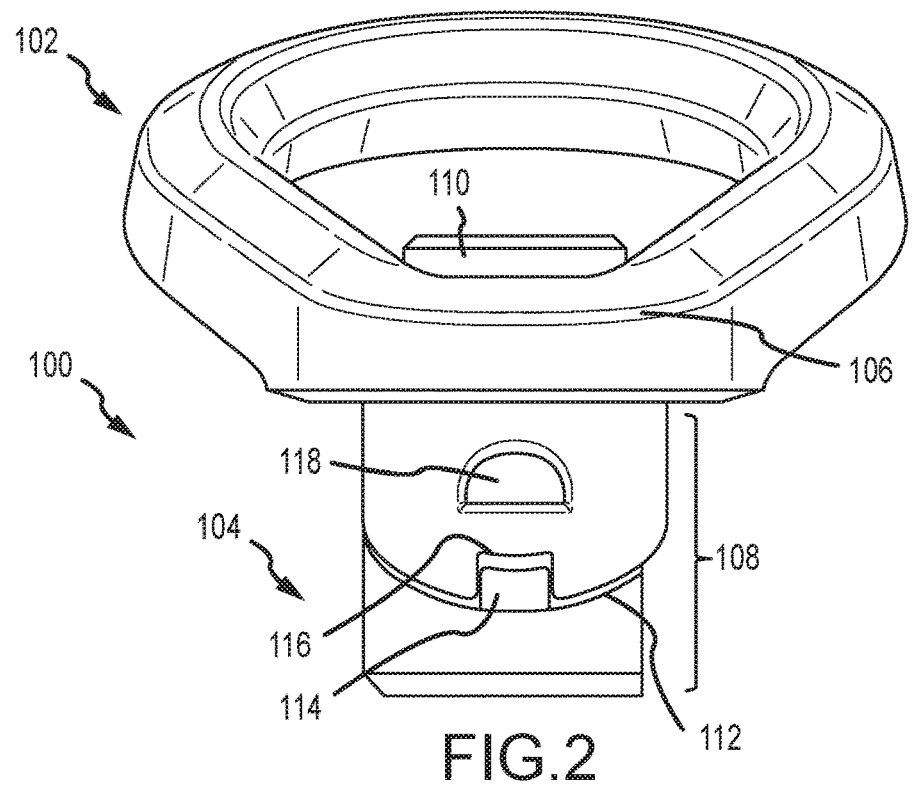
FIG. 2 is a front view of the adapter in FIG. 1.

In FIG. 2 it is seen that the tab 118 has a semi-circular profile as viewed from the front. While this can be effective for certain applications and certain QD sockets, it is not required, and other shapes and sizes of tabs 118 and 120 can be implemented. For instance, FIGS. 6B-6C illustrate some other embodiments of the tab 118. As seen, a common feature is that the tab 118 fits within an imaginary semicircle that corresponds to, or is slightly greater than an inner diameter of a QD socket (e.g., a 0.375" diameter semicircle).

Figure 6A:
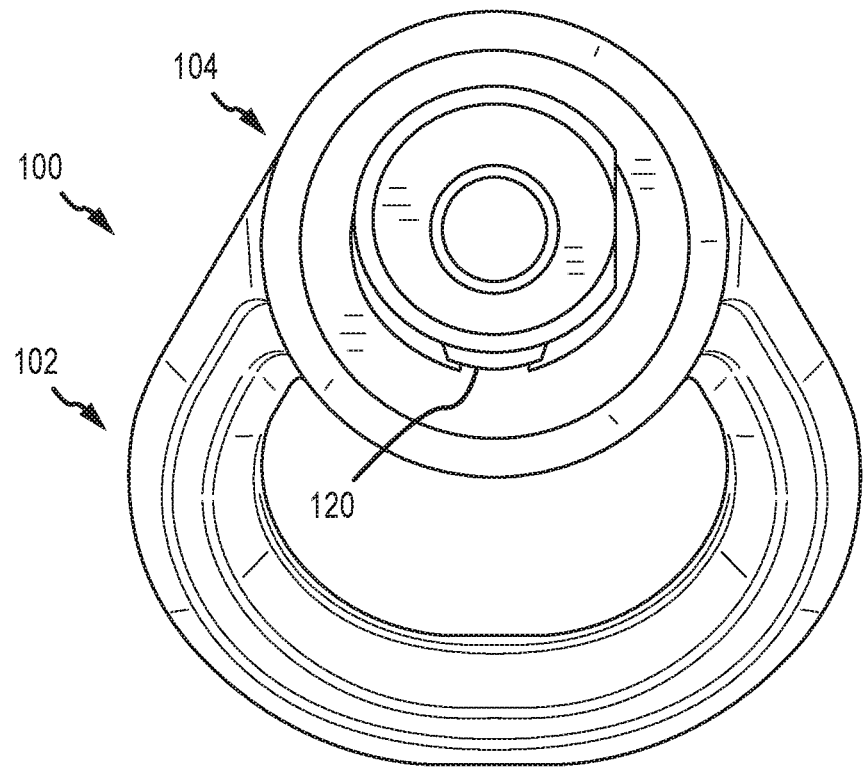
FIG. 6A is a bottom view of the adapter in FIG. 1.
Figure 6B:
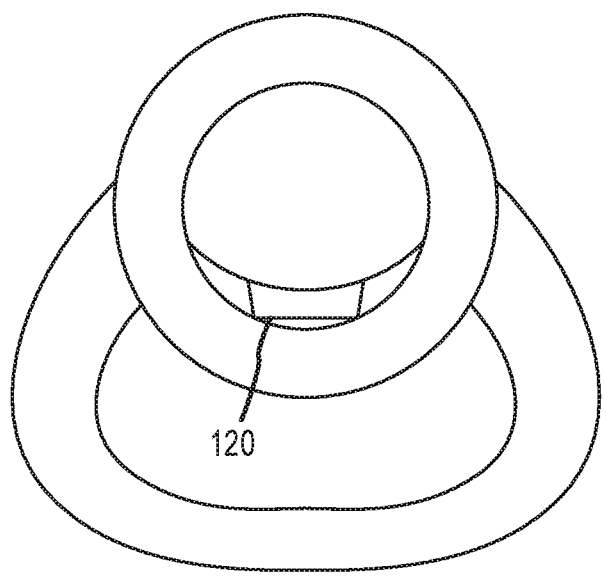
FIG. 6B is a bottom view of an alternative adapter having an alternative tab.
Figure 6C:
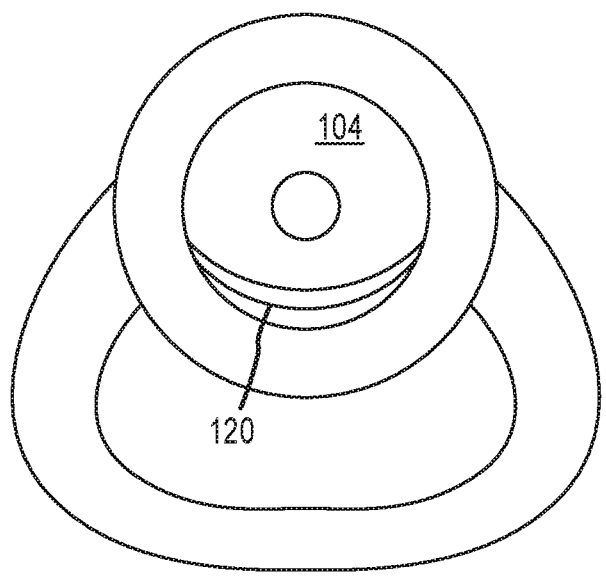
FIG. 6C is a bottom view of another alternative adapter having another alternative tab.

As seen most clearly in FIGS. 6A-6C, the lower portion 104 is not perfectly circular. In the illustrated embodiment, a front half of the lower portion 104 has a circular shape while the rear half has an elliptical or offset circular shape. It can also be seen that the tab 120 should fit into an imaginary circle that mimics the radius of the front half and then extends this radius to the back half. This radius can be equal to or wider than an inner radius of a QD socket. Additionally, FIGS. 6B-6C have been illustrated with exaggerated scales in order to more clearly show the elliptical or offset circular nature of the rear half (or rear portion) of the lower portion 104.

While a loop 106 has been illustrated and described, this attachment means is not limited to a loop or to the particular shape of a loop shown and described. Other attachment means may also be implemented without deviating from the intent and scope of this disclosure.

In some alternative embodiments, the adapter 100 can exclude one or both of the tabs 118, 120. For instance, where no tabs are implemented, the QD socket to which the adapter 100 is to be coupled may not have an annular groove for the tabs 118, 120 to engage.

While a guide ridge and valley 114, 116 have been illustrated, other alignment or guidance mechanisms can be used to ensure that the upper and lower portion 102, 104 move laterally relative to each other along a single plane.

While a screw 110 has been illustrated and described as the mechanism to apply force between the upper and lower portions 102, 104 and thereby expand or decrease the effective outer diameter of the connection post 108 interfacing with a QD socket, other means can be used such as a screw passing through slots in both the upper and lower portions 102, 104 (no threading) and a washer or nut below the lower portion 104. This is just one non-limiting example of other means that can be used to apply vertical force between the upper and lower portions 102, 104.

FIG. 6A is a bottom plan view of an alternative embodiment of a wedging adapter having an alternative shape to the tab 120 on the lower portion 104. FIG. 6B is a bottom plan view of an alternative embodiment of a wedging adapter having another alternative shape to the tab 120 on the lower portion 104. From these two examples it should be apparent that various shapes and sizes of the tab 120 can be implemented as long as the shape and size of the tab fits within a circle having an imaginary circle congruent with a front half of the lower portion 104 and having a diameter equal to or greater than an inner diameter of a QD socket to be interfaced with.

Figure 9A:
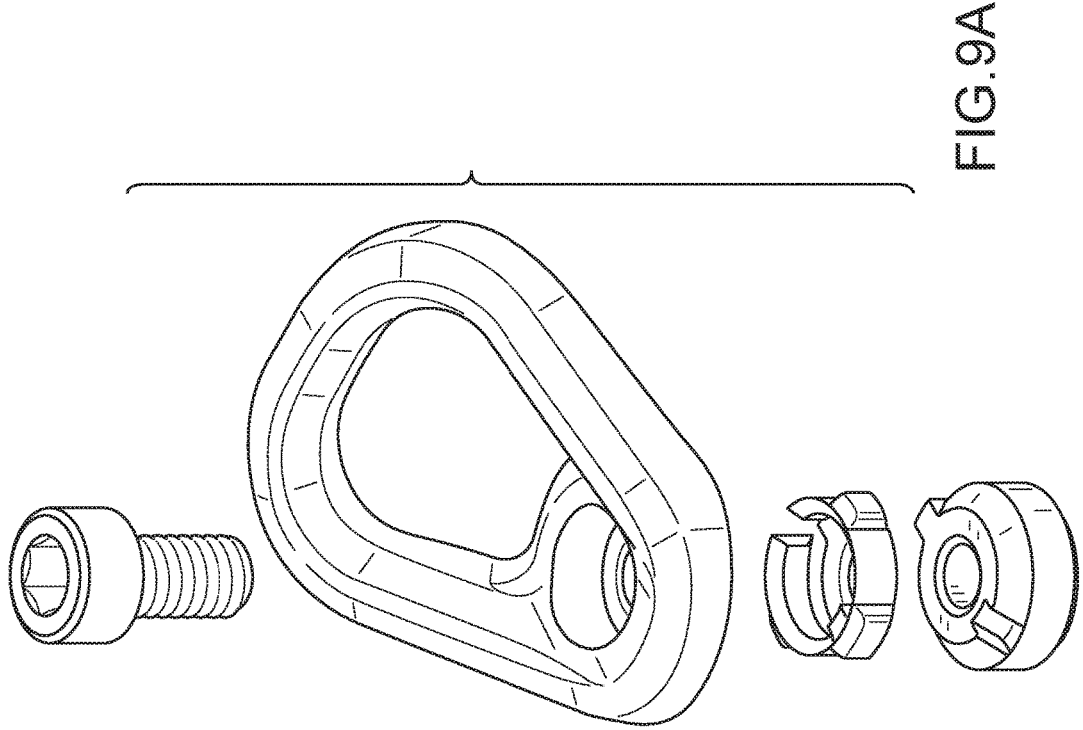
FIG. 9A is an isometric exploded view of the alternative adapter in FIG. 9.
Figure 9:
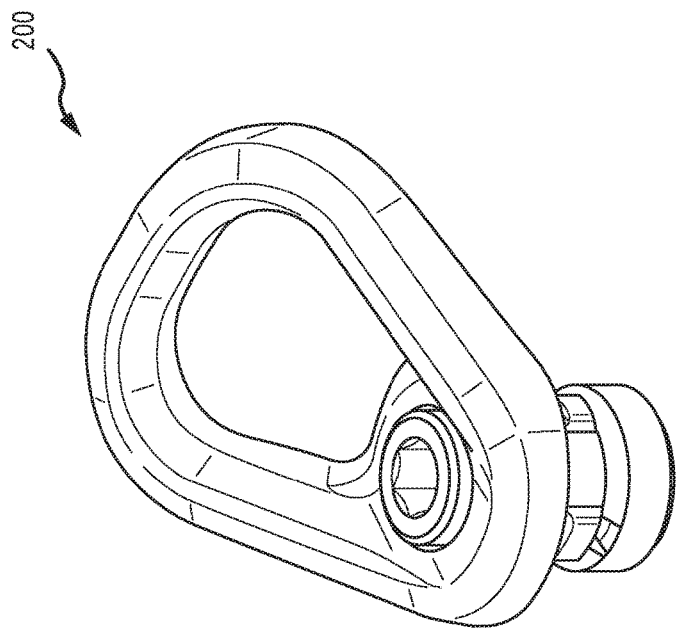
FIG. 9 is an isometric view of another alternative adapter having a wedging ring.
Figure 9B:
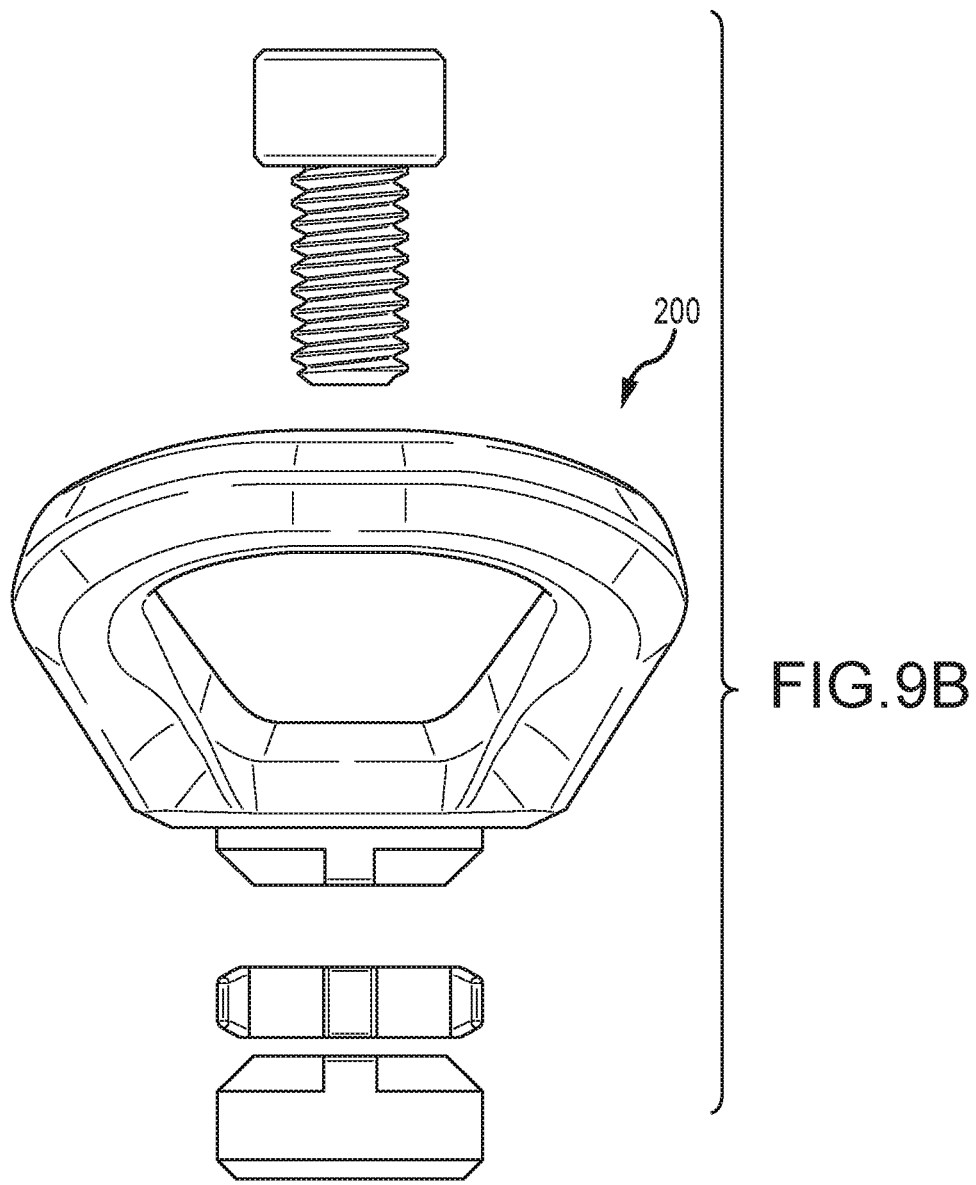
FIG. 9B is a rear exploded view of the alternative adapter in FIG. 9.

Turning now to FIGS. 9, 9A, and 9B, another embodiment of an adapter assembly 200 is now described. While the adapter assembly 200 now described has the general functionality of the embodiment shown in FIG. 1, the features and manner of operation is slightly different. Here, the assembly 200 has a screw 210 coupling a loop 206 to a lower portion 204, with an interface ring 232 therebetween. The interface ring 232 has one or more tabs 220 that may interface with a QD socket. A loop 206 may be provided as an attachment interface.

With specific reference to FIG. 9B, tightening the screw 210 causes the upper portion 202 of the assembly 200 to move closer to the lower portion 204. As the upper and lower portions 202, 204 approach one another, angled surfaces 234, 236 in the upper and lower portions 202, 204 respectively cause the interface ring 232 to expand outwardly, thereby increasing the effective overall diameter of the interface ring 232.

The interface ring 232 may be manufactured of a material that is more elastic than the upper and lower portions 202, 204.

Figure 10B:
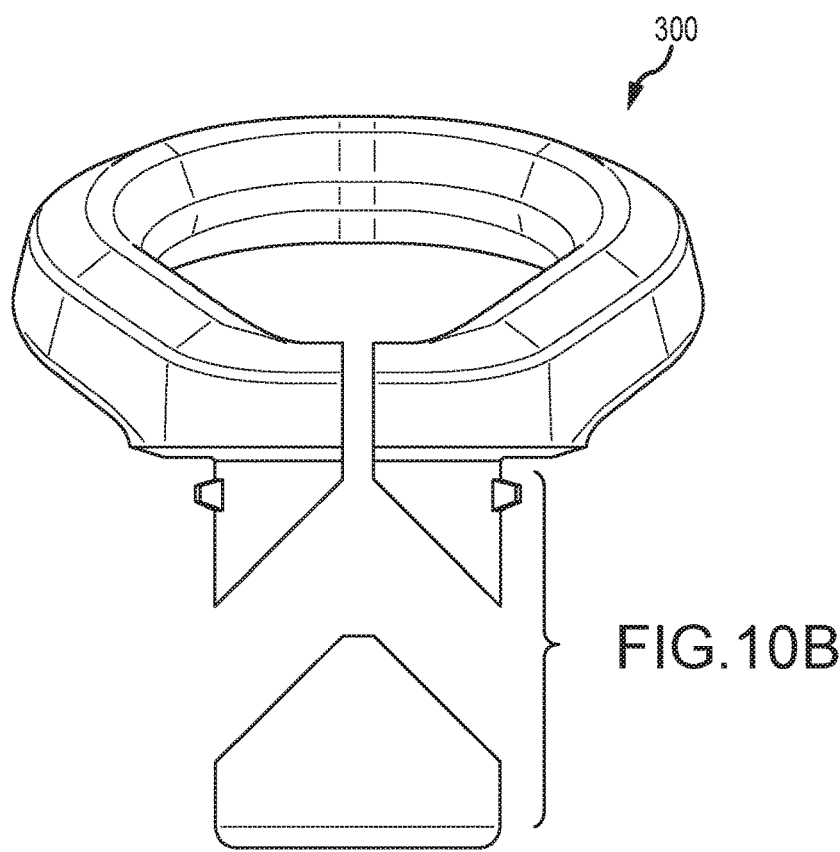
FIG. 10B is an exploded rear view of the upper portion and lower portion of the another alternative adapter in FIG. 10.
Figure 11:
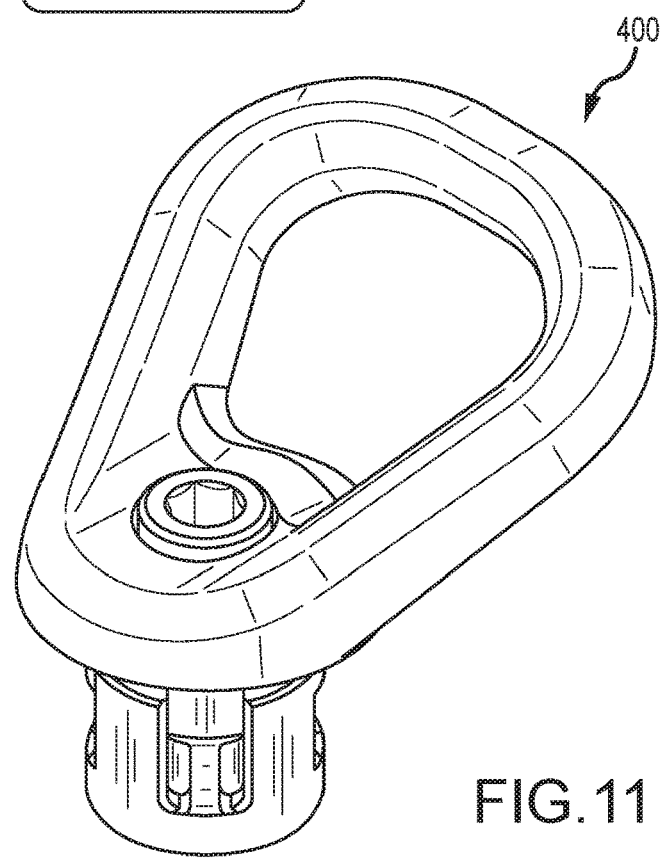
FIG. 11 is an isometric view of another alternative adapter having a wedging prong.

Turning now to FIGS. 10, 10A, and 10B, a third embodiment of the assembly 300 is now described. The assembly 300 is similar to assembly 200, with a loop 306, an upper portion 302, a lower portion 304, and a screw 310 attaching the upper and lower portions 302, 304. With specific reference to FIG. 10B, tightening the screw 310 (not shown in FIG. 10B to add clarity) causes the upper portion 302 to approach the lower portion 304. As the upper portion 302 approaches, one or more angled interfaces between the upper and lower portions 302, 304 causes the upper portion 302 to expand. The upper portion 302 has one or more tabs 320 that expand with the upper portion thereby increasing the overall effective diameter of the upper portion 302 to interface with a QD socket. A guide ridge 314 and a guide valley 316 may further be included, so as to limit relative rotation between the upper and lower portions 302, 304.

Although illustrated in FIGS. 10-10B as having an upper portion 302 that expands, it should be understood that the features and functionality may be reversed, such that the lower portion 304 expands as the upper and lower portions 302, 304 approach one another, to cause an effective overall diameter to be increased for interfacing with a QD socket.

Turning now to FIGS. 11, 11A-11C, a fourth embodiment of the assembly 400 is now described. The assembly 400 has an attachment interface 406 attached to an upper portion 402 which is, in turn, coupled to a lower portion 404 using a screw 410. The lower portion 404 has one or more tabs 420 that are caused to expand as the screw 410 is tightened. One or more of the tabs 420 may have an upper region 434 for interfacing with an angled surface 436 in the upper portion 402 to aide in expansion. As the tabs 420 are expanded, they increase the overall effective diameter of the adapter 400 for interfacing with a QD socket. Specifically, the upper region 434 of the tabs 420 may interface with a lip in a QD socket. The assembly 400 may also have a guide mechanism having a guide ridge 414 and a guide valley 416 in the upper and lower portions 402, 404 respectively, so as to prevent rotation of the upper portion 402 relative to the lower portion 404.

With brief reference now to FIG. 12, one embodiment of a typical QD socket 500 is shown. The QD socket 500 generally has an interior groove 502 into which tabs, such as tabs 118, 120, 220, 320, 420 may expand or move, so as to engage the QD socket 500 in a semi-permanent manner, that is, until the assembly 100, 200, 300, 400 is loosened and removed manually.

Figure 13:
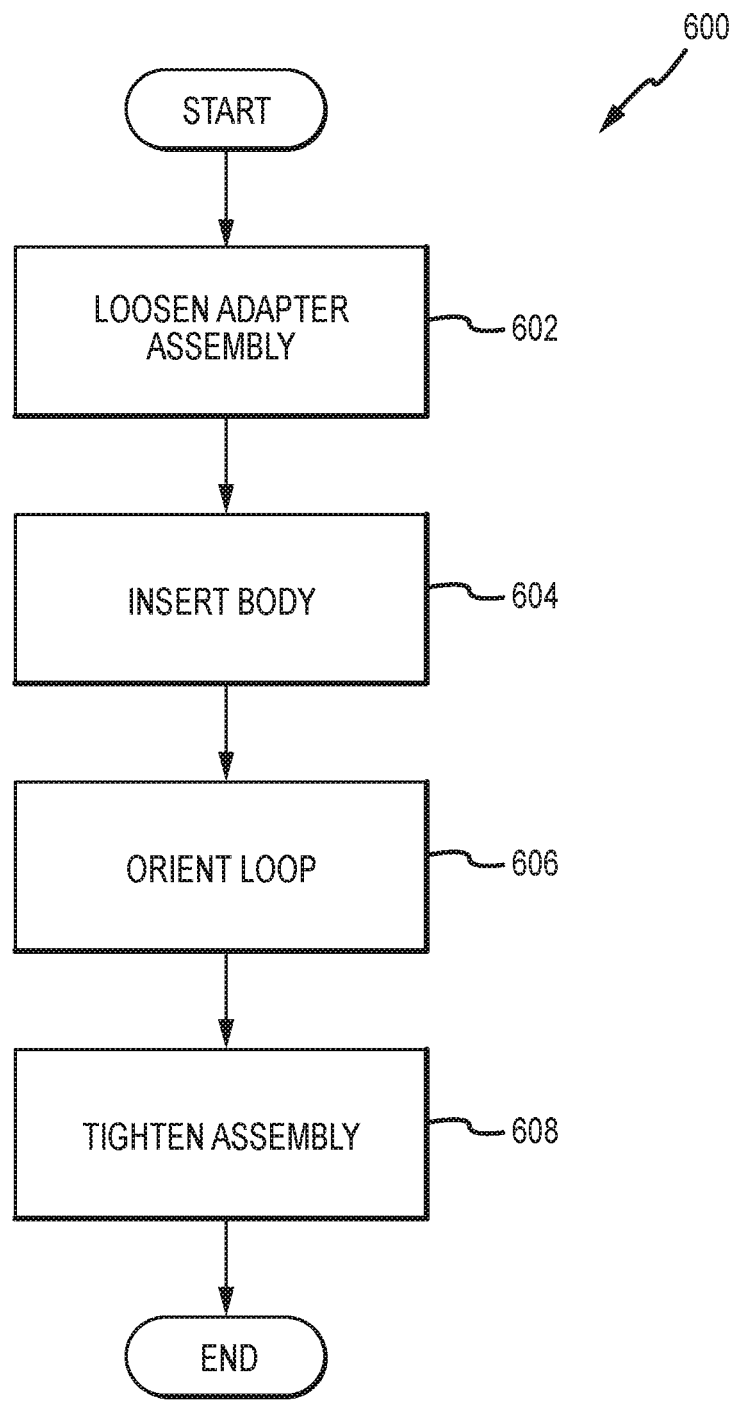
FIG. 13 is a flowchart of one embodiment of a method
Figure 14:
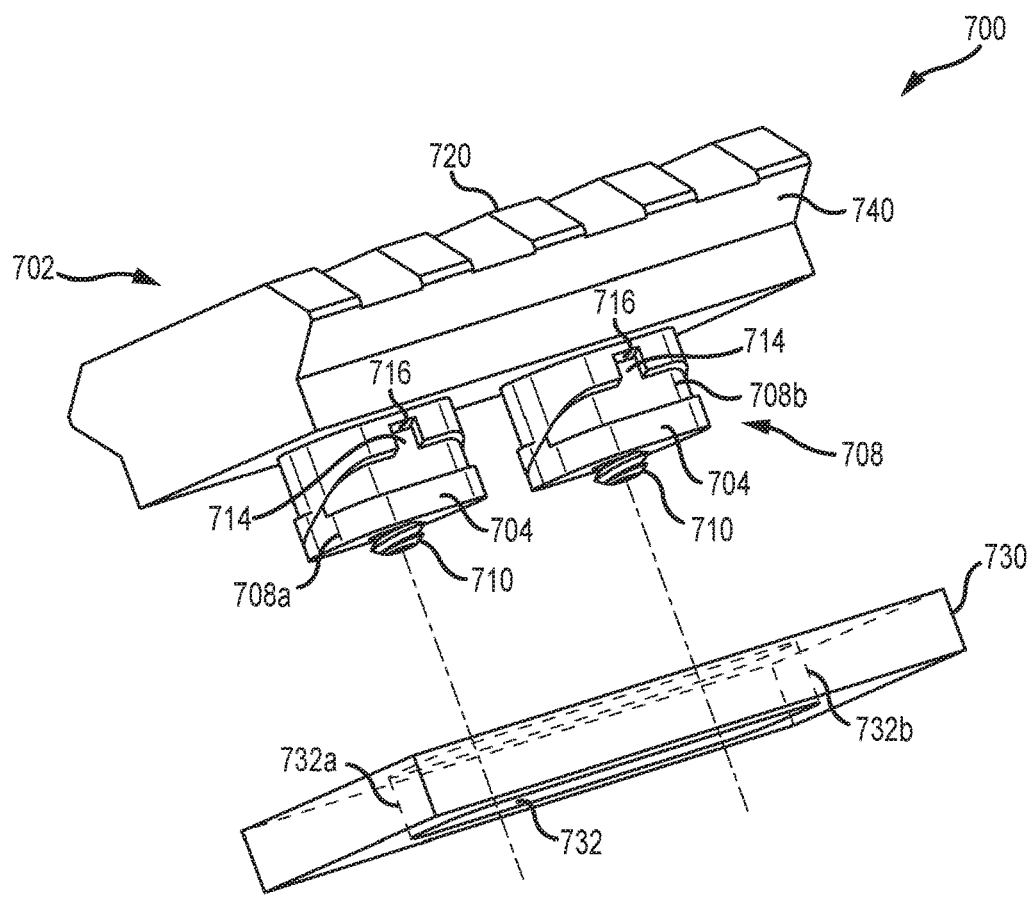
FIG. 14 is a perspective view of an exemplary connector with a scope mount attached.
Figure 15:
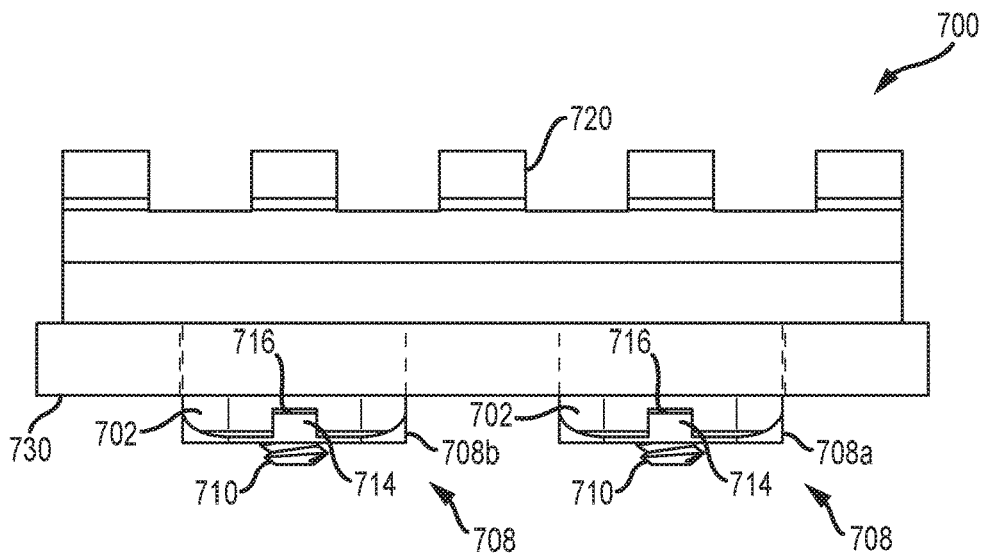
FIG. 15 is a first side view of the connector in FIG. 14 attached to a device wall.

Turning now to FIG. 13, a method 600 of modifying a quick disconnect interface into a semi-permanent attachment point is now described. The method 600 comprises providing 602 an adapter assembly having a plurality of tabs, the plurality of tabs movable between a first configuration having a first transverse distance between the plurality of tabs and a second configuration having a second transverse distance between the plurality of tabs, the first transverse distance greater than the second transverse distance.

The method 600 further includes loosening 604 the adapter assembly to allow the adapter assembly to move from the first configuration to the second configuration.

The method 600 further includes inserting 606 a distal portion of the adapter into a quick disconnect (QD) socket.

The method 600 further includes orienting 608 an accessory attachment interface on the adapter assembly to a desired position. In some embodiments, the accessory attachment interface is a loop.

The method 600 further includes tightening 610 the adapter assembly to cause the adapter assembly to move from the second configuration to an engagement configuration wherein the first and second tabs engage the QD socket to selectively couple the adapter assembly to the QD socket.

The method 600 may include limiting rotation of a second post portion of the adapter assembly relative to a first post portion of the adapter assembly and/or limiting the second post portion to travel between the first configuration and the second configuration.

The method 600 may include causing a first seat in the first post portion to contact a perpendicular contact surface in the first configuration, and causing a second seat in the first post portion to contact a parallel contact surface in the second configuration. The method 600 may include causing a first contact surface in the first post portion to contact a first contact surface in the second post portion in the first configuration, the first contact surface in the second post portion perpendicular to a longitudinal axis of the second post portion. The method 600 may also include causing a second contact surface in the first post portion to contact a second contact surface in the second post portion in the second configuration, the second contact surface in the second post portion parallel to the longitudinal axis of the second post portion. See, for example, the first contact surface 105 in FIG. 7, the first contact surface 109 in FIG. 8, the second contact surface(s) 107 in FIG. 7, and the second contact surface(s) 111 in FIG. 8.

The method 600 may include adjusting a fastener to cause the adapter assembly to move between the first configuration and the second configuration and/or causing the plurality of tabs to interface with one of a continuous annular groove in a QD socket, a discontinuous annular groove in a QD socket, and a plurality of openings in a QD socket.

In some embodiments, loosening 604 includes causing transverse movement of a first portion of the adapter assembly relative to a second portion of the adapter assembly, thereby narrowing an effective outer diameter of the distal portion of the adapter assembly, and tightening 610 includes causing transverse movement of the first portion relative to the second portion, thereby widening an effective outer diameter of the distal portion of the adapter assembly.

The method 600 may be practiced using one or more of the adapter assemblies 100, 200, 300, 400 described with reference to FIGS. 1-12.

Turning now to FIGS. 14-26, an accessory mounting interface and method are now described in further detail. The accessory mounting interface 700 may be configured to function substantially as previously described herein with reference to the adapter 100. However, the interface 700 may be configured to couple to an elongated slot 732 in a wall 730 of a firearm component. More specifically, the interface 700 may include two connection posts 708, positioned a distance from each other.

In some embodiments, a lower post portion of the interface 700 functions substantially as described with reference to the QD adapter above. In some embodiments, corner engagement features, such as curved or arced features of the lower post portion, function in a manner substantially as described with reference to the lower fasteners illustrated and described in U.S. Patent Publication No. 2016/0187100 A1, published on Jun. 30, 2016, inventors Mayberry et al., the entire disclosure of which is incorporated herein by reference.

The interface 700 may have an upper portion 702 having a firearm accessory 740, which may be an accessory rail 720, and at least one through hole 750 (see e.g. FIG. 21) extending from a first surface 750a to a second surface 724 (see e.g. FIG. 22) of the upper portion 702. As most clearly seen in FIG. 19, the upper portion 702 may have a first post portion 703 with a first side surface 722 and a first flange 736.

A first elongated fastener 710 may be arranged through or configured to pass the through hole 750, and, upon assembly, may extend below the second surface 724 of the upper portion 702 to engage a lower portion, which may be referenced herein as a second post portion 704. The second post portion 704 may have a second flange 734 (see e.g. FIG. 20) and a second side surface 728, the second side surface 728 at least partially opposing the first side surface 722. The second post portion 704 may be movably coupled to the first elongated fastener 710.

The second post portion 704 may be movable between a first configuration defining a first transverse distance W1 (see e.g. FIG. 17) between the first and second side surfaces 722, 728 and a second configuration defining a second transverse distance W2 (see e.g. FIG. 16) between the first and second side surfaces 722, 728, the first transverse distance W1 greater than the second transverse distance W2.

The first flange 736 may substantially oppose the second flange 734 when the second post portion 704 is in the first configuration.

The interface 700 may include a guide mechanism shaped to limit rotation of the second post portion 704 relative to the first post portion 703. As illustrated most clearly in FIG. 19, the guide mechanism may have a guide ridge 714 interfacing with a guide valley 716. The guide ridge 114 may be provided in either of the second post portion 704 or the first post portion 703. The guide valley 716 may be provided in the other one of the second post portion 704 or the first post portion 703.

The guide mechanism may also or alternatively include an engagement between the second side surface 728 and the elongated slot 732, and/or an engagement between a corner surface of the second post portion 704 and a corner of the elongated slot 732, preventing the second post portion 704 from rotating relative to the elongated slot 732 and/or the first post portion 703.

Figure 16:
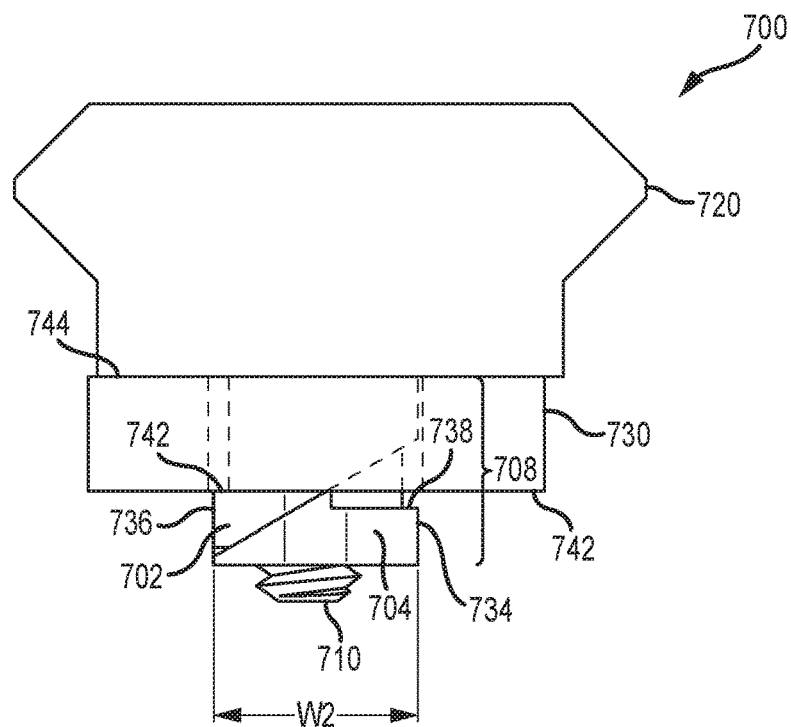
FIG. 16 is an end view of the connector in FIG. 14 inserted through a device wall and in an unlocked configuration.

In some embodiments, an upper portion 738 of the first flange 736 does not oppose an upper portion 742 of the second flange 734 when the second post portion 704 is in the second configuration, as illustrated in FIG. 16.

Figure 17:
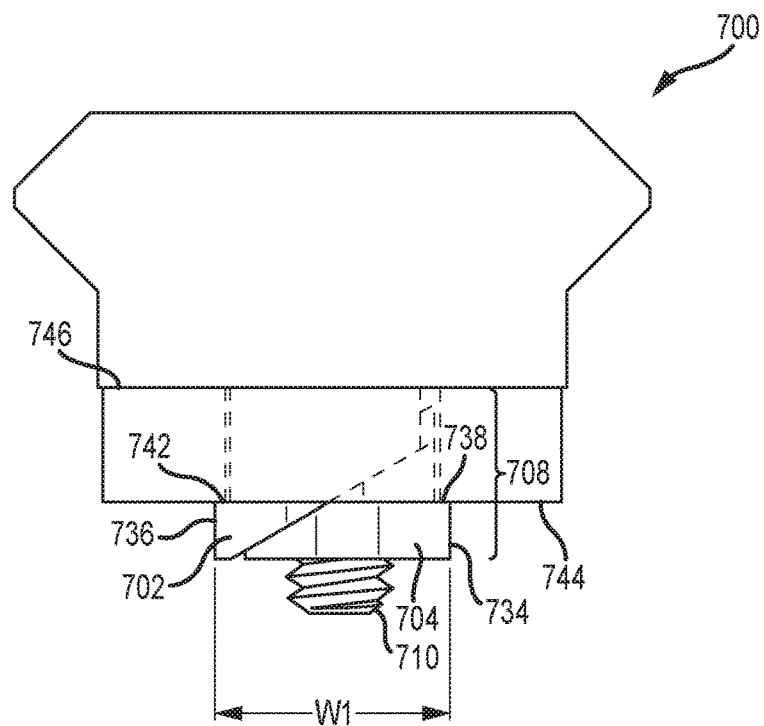
FIG. 17 is an end view of the connector in FIG. 14 inserted through a device wall and in a locked configuration.

Stated differently, and with reference to FIG. 17, in some embodiments, the first flange 736 may have an upper flange surface 742, and the second flange 734 may have an upper flange surface 738. The upper surface 742 of the first flange 736 and the upper surface 738 of the second flange 734 may engage an inner surface 744 of a firearm component 730 or wall of a firearm, and a lower surface 758 (see e.g. FIG. 22)

of the accessory 720, 740 may engage the outer surface 746 of the firearm component 730 (or wall) when in the first configuration.

In a manner similar to the QD post 100, the second post portion 704 may abut the first post portion 703 at an angle relative to the longitudinal axis of the first post portion, the angle between 15 degrees and 45 degrees. Adjustment of the fastener 710 may cause the first and second post portions 703, 704 to slide relative to each other. In some embodiments, the second post portion 704 may be slidingly engaged with the first post portion 703.

Figure 20:
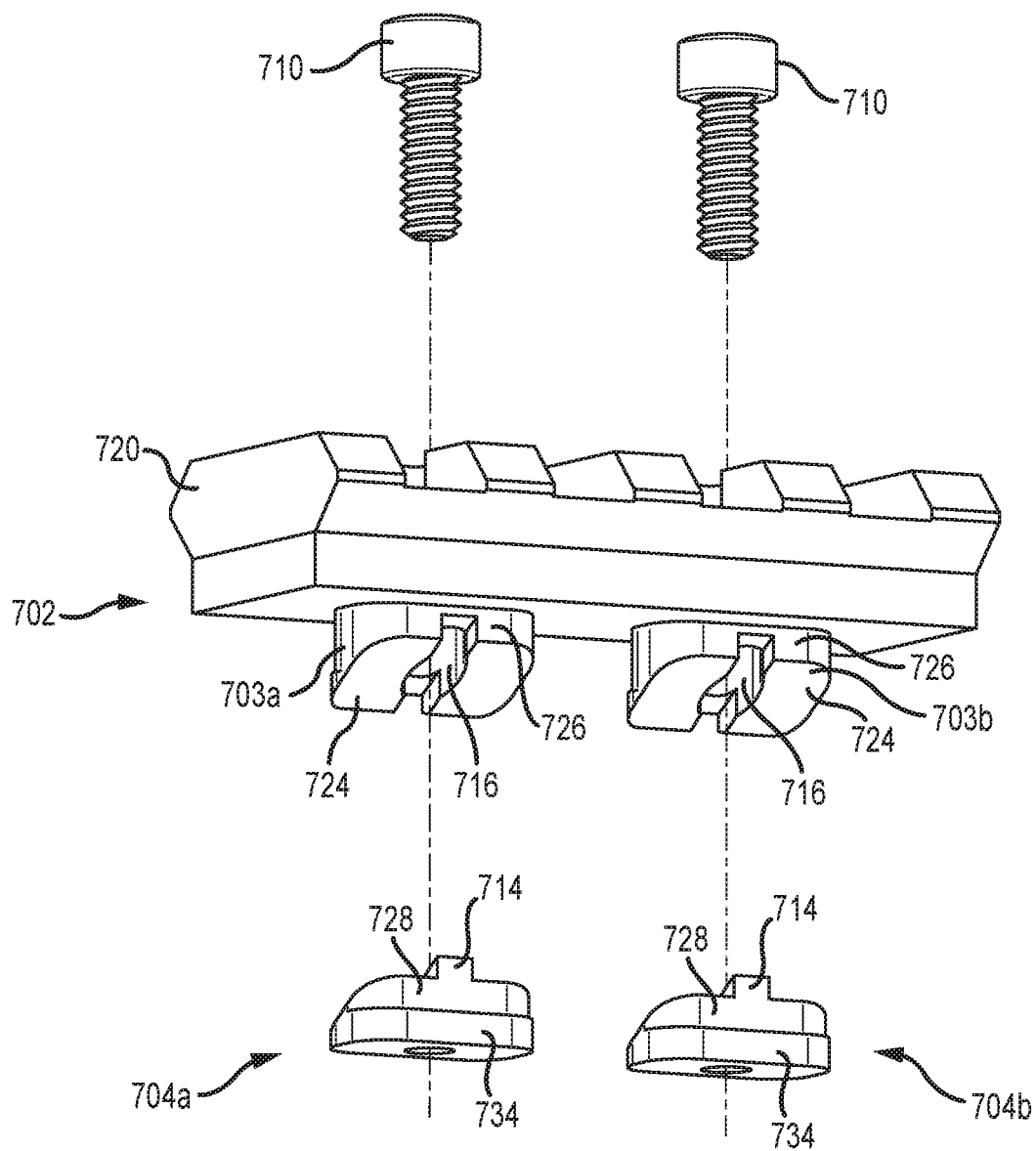
FIG. 20 is another exploded perspective view of the connector in FIG. 14.
Figure 21:
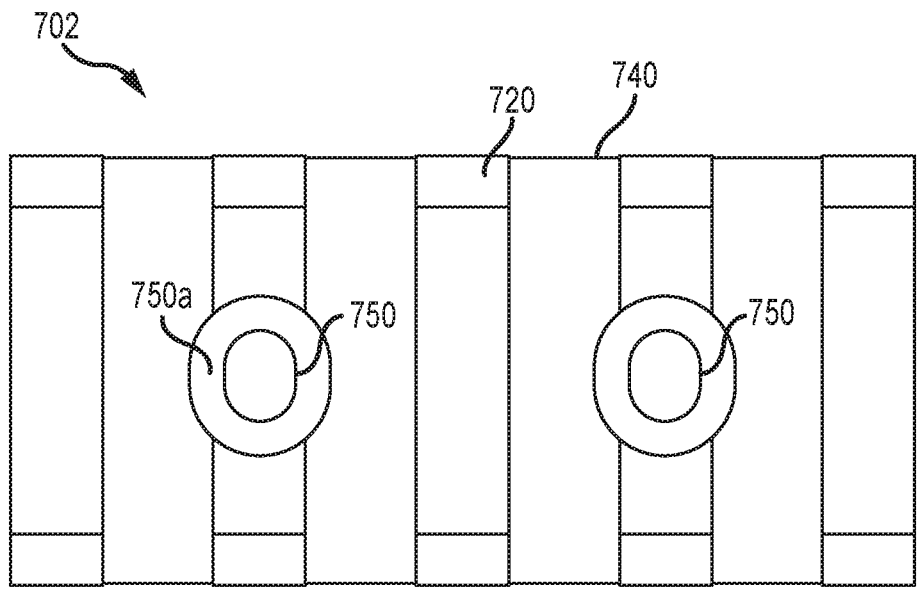
FIG. 21 is a top view of a component of the connector in FIG. 14.
Figure 22:
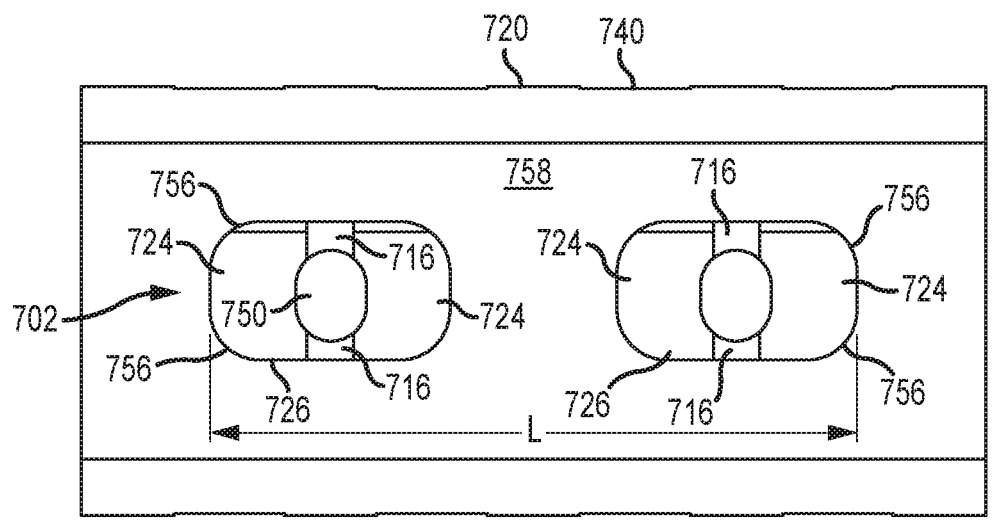
FIG. 22 is a bottom view of the component in FIG. 21.
Figure 23:
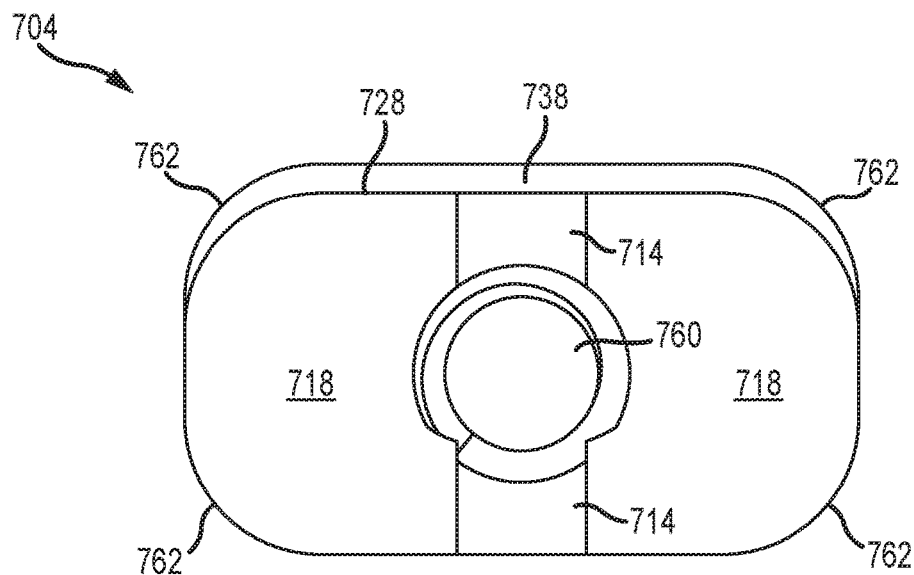
FIG. 23 is a top view of another component of the connector in FIG. 14.
Figure 24:
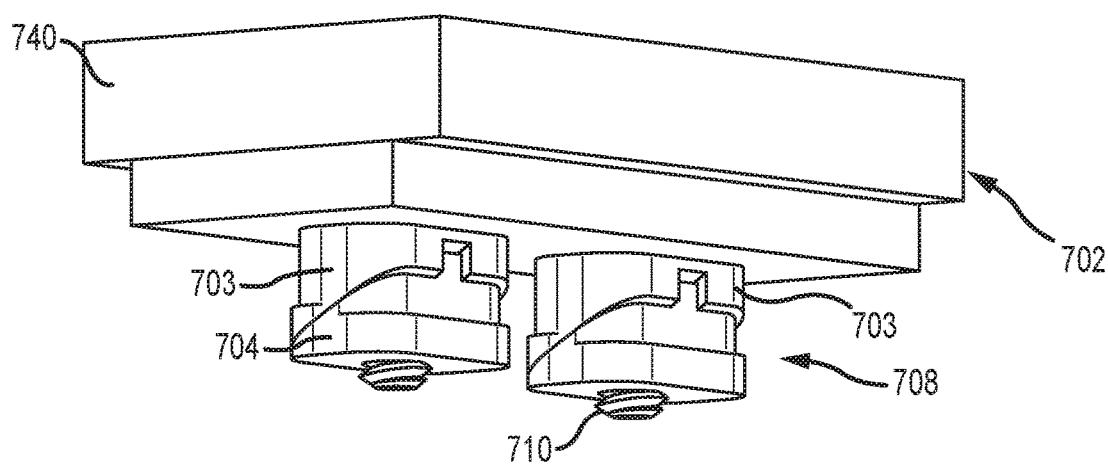
FIG. 24 is a perspective view of the connector in FIG. 14 without a scope mount.
Figure 25:
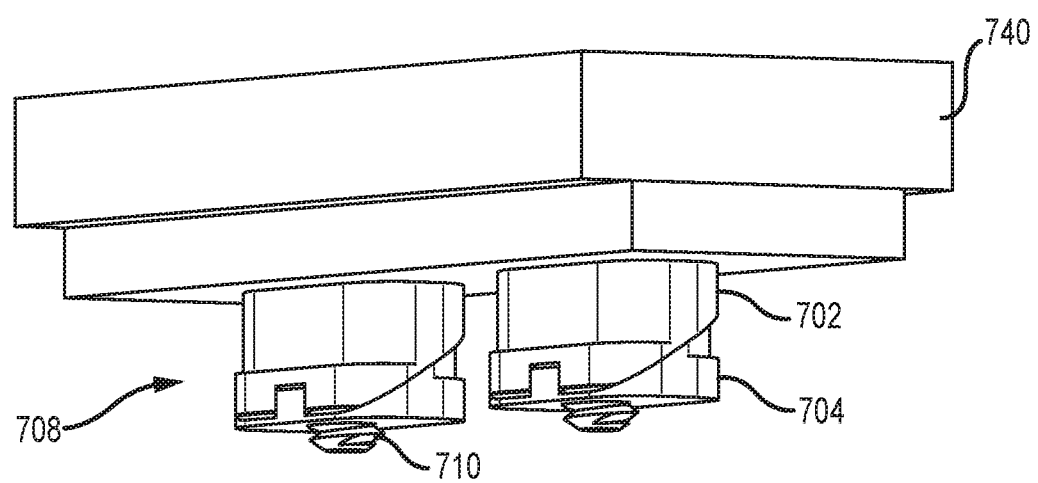
FIG. 25 is another perspective view of the connector in FIG. 14 without a scope mount.
Figure 26:
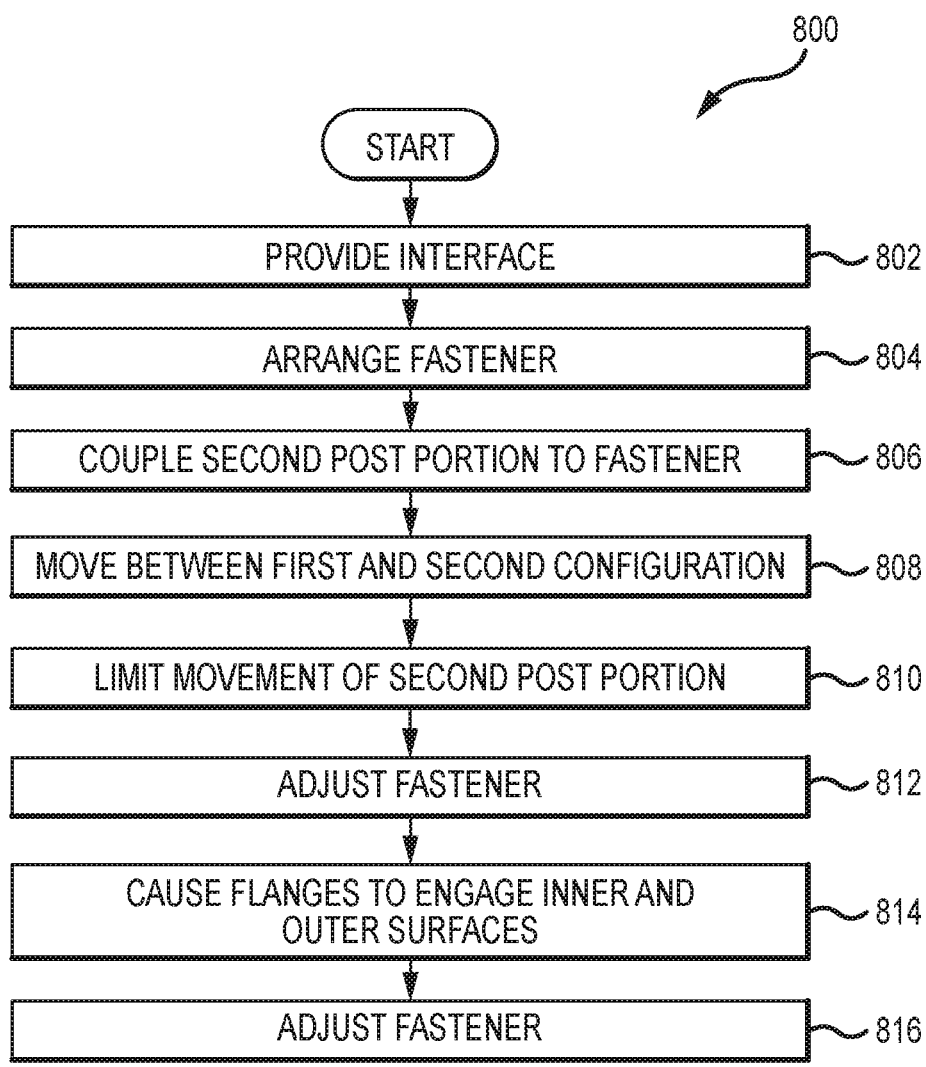
FIG. 26 is a flowchart of a method.

Continuing with FIG. 20, the upper portion 702 may have a second through hole extending from the first surface to the second surface of the upper portion 702, and a third post portion 703b positioned a distance from the first post portion 703a. A second elongated fastener 710 may be arranged through the second through hole. A fourth post portion 704b may be movably coupled to the third post portion 703b, in a manner similar to that of the second post portion 704a and the first post portion 703a.

The third post portion 703b may have a distal edge, and the first post portion 703a may have a proximal edge, and a distance between the distal edge and the proximal edge may be less than the length L of the elongated slot 732. The second and fourth post portions 704a, 704b may be similarly spaced, but also spaced such that one or more corners in the second or fourth post portions 704a, 704b may engage respected corners of the elongated slot 732 to prevent the second and/or fourth post portions 704a, 704b from rotating relative to the elongated slot 732 and/or the first and third post portions 703a, 703b. That is, a corner in the third post portion 703b may engage a first slot corner in the elongated slot, and a corner in the first post portion 703a may engage a second slot corner in the elongated slot. Relatedly, a corner in the second post portion 704a may engage a corner in the elongated slot, and a corner in the fourth post portion 704b may engage another slot corner in the elongated slot.

Figure 18:
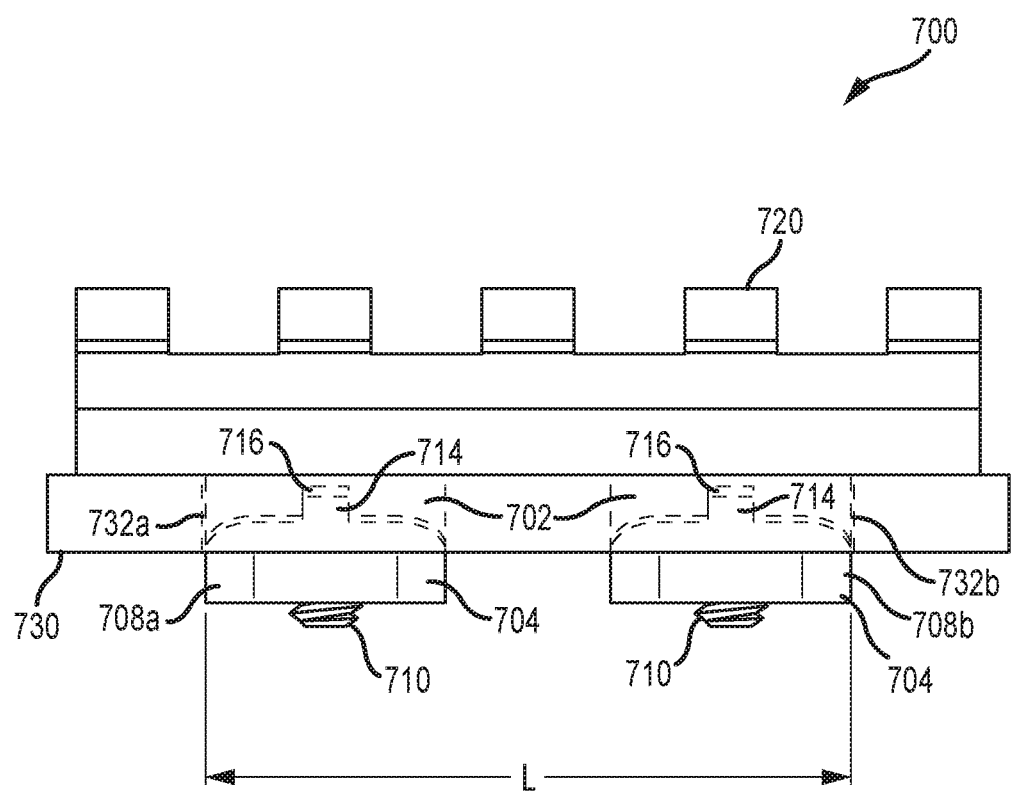
FIG. 18 is a second side view of the connector in FIG. 14 attached to a device wall.
Figure 19:
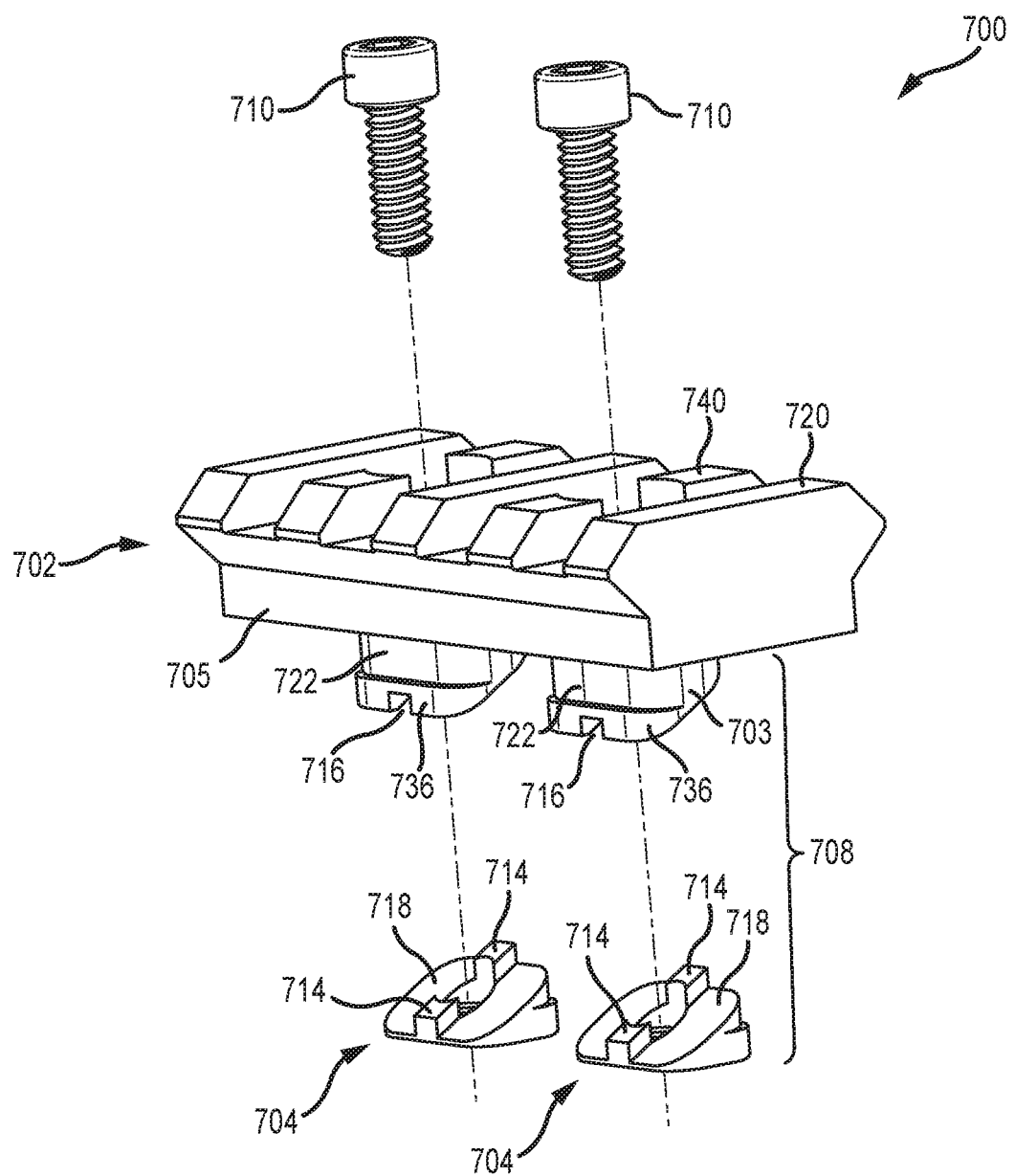
FIG. 19 is an exploded perspective view of the connector in FIG. 14.

As best illustrated in FIG. 18, a pair of connection posts 708 may be positioned such that a proximal portion of a first connection post 708a is shaped to engage a proximal portion 732a of the elongated slot 732, and a distal portion of a second connection post 708b is shaped to engage a distal portion 732b of the same elongated slot 732.

A method 800 of attaching an accessory mounting interface is also disclosed herein, and may be achieved using the interface 700 illustrated in FIGS. 14-25. The method 800 may include one or more of the steps illustrated in FIG. 26. The method 800 may include attaching an interface to a firearm having an elongated slot, the elongated slot having a length greater than a width. The method 800 may include providing 802 an accessory mounting interface. The interface may include one or more of the features described with reference to FIGS. 14-25. The method my further include arranging 804 8the first elongated fastener such that the elongated fastener extends through the through hole below the second surface of the upper portion. The method 800 may also include movably coupling 806 the second post portion to the first elongated fastener. The method 800 may also include moving 808 the second post portion between a first configuration defining a first transverse distance between the first and second side surfaces and a second configuration defining a second transverse distance between the first and second tabs, the first transverse distance greater than the second transverse distance. The first flange may substantially oppose the second flange when the second post portion is in the first configuration.

The method 800 may also include limiting rotation of the second post portion relative to the first post portion of the adapter assembly.

The method 800 may include limiting the second post portion to travel between the first configuration and the second configuration.

The method 800 may include adjusting 812 the elongated fastener to cause the second post portion to move between the first configuration and the second configuration.

In some embodiments, an upper portion of the first flange does not oppose an upper portion of the second flange when the second post portion is in the second configuration.

The method 800 may include causing 814 an upper surface of the first flange and an upper surface of the second flange to engage an inner surface of the firearm component, and causing a lower surface of the accessory to engage an outer surface of the firearm component when the first post portion is in the first configuration.

The method 800 may include adjusting 816 the first elongated fastener to effectuate a relative sliding motion between the first and second post portions.

Providing 802 the accessory mounting interface may include providing the interface having the upper portion with a second through hole extending from the first surface to the second surface of the upper portion, and a third post portion positioned a distance from the first post portion. The method 800 may further include arranging a second elongated fastener such that the second elongated fastener extends through the through hole below the second surface of the upper portion. The method 800 may further include movably coupling a fourth post portion to the third post portion.

The method 800 may include causing a corner in the third post portion to engage a first slot corner in the elongated slot, and causing a corner in the first post portion to engage a second slot corner in the elongated slot. The method 800 may include causing a corner in the second post portion to engage a proximal portion of the elongated slot, and causing a corner in the fourth post portion to engage a distal corner in the elongated slot, for example, to prevent rotation of the second and/or fourth post portions from rotating relative to the elongated slot or first/third post portions. The method 800 may include causing a curved portion in the fourth post portion to engage a distal curved portion in the elongated slot, and causing a curved portion in the second post portion to engage a proximal curved portion in the elongated slot.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An accessory mounting interface for an elongated slot in a firearm, the elongated slot having a length greater than a width, the interface comprising:
   an upper portion having a firearm accessory and at least a first and second through hole extending from a first surface to a second surface of the upper portion, the upper portion having a first post portion with a first side surface and a first flange;

a first elongated fastener arranged through the first through hole and having a first end extending below the second surface of the upper portion; and a second post portion having a second flange and a second side surface, the second side surface at least partially opposing the first side surface, the second post portion coupled to the first elongated fastener; wherein the second post portion is movable between a first configuration defining a first transverse distance between the first and second side surfaces and a second configuration defining a second transverse distance between the first and second side surfaces, the first transverse distance greater than the second transverse distance;

the upper portion further having a third post portion positioned a distance from the first post portion; and the first flange substantially opposes the second flange when the second post portion is in the first configuration.

2. The interface of claim 1, further comprising:
a guide mechanism shaped to limit rotation of the second post portion relative to the first post portion, the guide mechanism having at least one of
  (a) a guide ridge interfacing with a guide valley, the guide ridge in one of the second post portion or the first portion, the guide valley in the other one of the second post portion or the first post portion; or
  (b) an engagement between the second side surface and the elongated slot.

3. The interface of claim 1, wherein:
an upper portion of the first flange does not oppose an upper portion of the second flange when the second post portion is in the second configuration.

4. The interface of claim 1, wherein:
the first flange has an upper flange surface;
the second flange has an upper flange surface; and
the elongated slot is an elongated slot in a firearm component having an inner surface and an outer surface; and wherein
the upper surface of the first flange and the upper surface of the second flange engage the inner surface of the firearm component and a lower surface of the accessory engages the outer surface of the firearm component when in the first configuration.

5. The interface of claim 1, wherein:
the second post portion abuts the first post portion at an angle relative to the longitudinal axis of the first post portion, the angle between 15 degrees and 45 degrees; and
wherein adjustment of the fastener causes the first and second post portions to slide relative to each other.

6. The interface of claim 1, further comprising:
a second elongated fastener arranged through the second through hole; and
a fourth post portion movably coupled to the third post portion.

7. The interface of claim 6, wherein:
the third post portion has a distal edge and the first post portion has a proximal edge, a distance between the distal edge and the proximal edge being less than the length of the elongated slot.

8. The interface of claim 7, wherein:
a corner in the third post portion engages a distal corner in the elongated slot; and
a corner in the first post portion engages a proximal corner in the elongated slot.

9. The interface of claim 7, wherein:
a curved portion in the fourth post portion engages a distal curved portion in the elongated slot; and
a curved portion in the second post portion engages a proximal curved portion in the elongated slot.

10. A method of attaching an accessory mounting interface to a firearm having an elongated slot, the elongated slot having a length greater than a width, the method comprising:
providing an accessory mounting interface comprising:
  (a) an upper portion having a firearm accessory and at least a first and second through hole extending from a first surface to a second surface of the upper portion, the upper portion having a first post portion with a first side surface and a first flange;
  (b) a first elongated fastener;
  (c) a second post portion having a second flange and a second side surface, the second side surface at least partially opposing the first side surface; and
  (d) a third post portion coupled to the upper portion and positioned a distance from the first post portion;
arranging the first elongated fastener such that the first elongated fastener extends through the first through hole below the second surface of the upper portion;
movably coupling the second post portion to the first elongated fastener;
moving the second post portion between a first configuration defining a first transverse distance between the first and second side surfaces and a second configuration defining a second transverse distance between the first and second side surfaces, the first transverse distance greater than the second transverse distance; wherein
the first flange substantially opposes the second flange when the second post portion is in the first configuration.

11. The method of claim 10, further comprising:
limiting rotation of the second post portion relative to the first post portion of the adapter assembly.

12. The method of claim 11, further comprising:
limiting the second post portion to travel between the first configuration and the second configuration.

13. The method of claim 10, further comprising:
adjusting the first elongated fastener to cause the second post portion to move between the first configuration and the second configuration.

14. The method of claim 10, wherein:
an upper portion of the first flange does not oppose an upper portion of the second flange when the second post portion is in the second configuration.

15. The method of claim 10, wherein:
causing an upper surface of the first flange and an upper surface of the second flange to engage an inner surface of the firearm component; and
causing a lower surface of the accessory to engage an outer surface of the firearm component when the first post portion is in the first configuration.

16. The method of claim 10, further comprising:
adjusting the first elongated fastener to effectuate a relative sliding motion between the first and second post portions.

17. The method of claim 10, wherein:
the method further comprises:
arranging a second elongated fastener such that the second elongated fastener extends through the second through hole below the second surface of the upper portion; and movably coupling a fourth post portion to the third post portion.

18. The method of claim 17, wherein:
the third post portion has a distal edge and the first post portion has a proximal edge, a distance between the distal edge and the proximal edge being less than the length of the elongated slot.

19. The method of claim 18, further comprising:
causing a corner in the third post portion to engage a first slot corner in the elongated slot; and
causing a corner in the first post portion to engage a second slot corner in the elongated slot.

20. The method of claim 18, further comprising:
causing a curved portion in the fourth post portion to engage a distal curved portion in the elongated slot; and
causing a curved portion in the second post portion to engage a proximal curved portion in the elongated slot.

* * * * *